(12) United States Patent
Izumi et al.

(10) Patent No.: US 7,016,096 B2
(45) Date of Patent: Mar. 21, 2006

(54) TRANSMISSION WAVELENGTH CHARACTERISTICS VARIABLE OPTICAL ELEMENT, AND WAVELENGTH CHARACTERISTICS VARIABLE APPARATUS, OPTICAL AMPLIFIER, AND OPTICAL TRANSMISSION SYSTEM, USING SAME

(75) Inventors: Hirotomo Izumi, Sapporo (JP);
Takashi Ishiwada, Sapporo (JP);
Nobuaki Mitamura, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 245 days.

(21) Appl. No.: 10/351,376

(22) Filed: Jan. 27, 2003

(65) Prior Publication Data

US 2003/0218796 A1     Nov. 27, 2003

(30) Foreign Application Priority Data

May 21, 2002  (JP)  ............................. 2002-146643

(51) Int. Cl.
G02F 1/09   (2006.01)
G03B 21/56  (2006.01)
H04B 10/12  (2006.01)

(52) U.S. Cl. ...................... 359/280; 359/454; 359/455; 359/337.22

(58) Field of Classification Search ........ 356/454–455; 359/280, 454, 455, 337.22
See application file for complete search history.

(56) References Cited

U.S. PATENT DOCUMENTS

| | | | |
|---|---|---|---|
| 6,339,492 B1 | 1/2002 | Terahara et al. | |
| 6,359,726 B1 * | 3/2002 | Onaka et al. | 359/337.1 |
| 6,421,303 B1 * | 7/2002 | Inoue et al. | 369/13.01 |
| 6,493,129 B1 * | 12/2002 | Terahara et al. | 359/283 |
| 6,690,501 B1 * | 2/2004 | Li et al. | 359/251 |
| 2002/0191881 A1 * | 12/2002 | Chen et al. | 385/11 |
| 2003/0081319 A1 * | 5/2003 | Hsu | 359/579 |
| 2003/0174381 A1 * | 9/2003 | Ishiwada et al. | 359/280 |

FOREIGN PATENT DOCUMENTS

| | | |
|---|---|---|
| JP | 59-151065 | 8/1984 |
| JP | 61-279806 | 12/1986 |
| JP | 09-021608 | 1/1997 |
| JP | 11-014939 | 1/1999 |

(Continued)

OTHER PUBLICATIONS

R. M. Jopson, et al. "Nonreciprocal Transmission in a Fiber Fabry-Perot Resonator containing a magnetooptic material", IEEE Phot. Tech. Lett. vol. 2, No. 10, pp. 702-704, Oct. 1990.*

(Continued)

*Primary Examiner*—Jack Keith
*Assistant Examiner*—Eric Bolda
(74) *Attorney, Agent, or Firm*—Staas & Halsey LLP

(57) ABSTRACT

An object of the invention is to easily realize an optical element using an etalon type structure, capable of changing a periodic transmission wavelength characteristic in an axial direction of transmissivity, and also capable of changing a periodic characteristic with respect to wavelength. To this end, a transmission wavelength characteristics variable optical element according to the invention comprises: a light interference section including a pair of wedge shape magneto-optic crystals arranged with taper faces thereof in close contact, that can change a distance between reflecting films formed on parallel planes of the magneto-optic crystals, by relatively moving the magneto-optic crystals by movable sections, permanent magnets for applying a fixed magnet field to the pair of magneto-optic crystals, an electromagnet for applying a variable magnetic field in a direction different to the fixed magnetic field, and a variable current source controlling the current flowing into the electromagnet.

26 Claims, 17 Drawing Sheets

FOREIGN PATENT DOCUMENTS

| | | |
|---|---|---|
| JP | 11-162032 | 6/1999 |
| JP | 11-212044 | 8/1999 |

OTHER PUBLICATIONS

D. Goldring et al. "Magneto-optic-based devices for polarization control", Journal of optics A, vol. 6 (2004) pp. 98-105.*

Noriyuki Takeda, et al., "Gain Equalization of Er-doped Fiber Amplifier Using Etalon Filter", The Institute of Electronics, Information and Communication Engineers, Society Congress, 1995, 8759, 1995 (p. 426 with translation).

Kazuyou Mizuno, et al., "Development of Etalon-Type Gain-Flattening Filter", Furukawa Review, No. 19, 2000 (pp. 53-58).

* cited by examiner

INCIDENT LIGHT

ANGLE OF POLARIZATION PLANE OF LIGHT EMITTED FROM LIGHT INTERFERENCE SECTION

INTERFERENCE EFFECT OF LIGHT T1, T2 WITH RESPECT TO LIGHT T0

TRANSMISSION WAVELENGTH CHARACTERISTICS VARIABLE OPTICAL ELEMENT, AND WAVELENGTH CHARACTERISTICS VARIABLE APPARATUS, OPTICAL AMPLIFIER, AND OPTICAL TRANSMISSION SYSTEM, USING SAME

BACKGROUND OF THE INVENTION

1. Field of the Invention

The present invention relates to an etalon-type optical element capable of varying periodic transmission wavelength characteristics of an optical element, which is used in the field of optical communications or the like, and a wavelength characteristics variable apparatus, an optical amplifier and an optical transmission system, using the etalon-type optical element.

2. Description of the Related Art

In optical transmission systems which transmit optical signals over a long distance, there has been recently employed a wavelength division multiplexing (WDM) optical transmission system that increases the number of optical amplification repeaters for increasing long-distance transmission, and also multiplexes a plurality of optical signals having different wavelengths to transmit the multiplexed optical signals for increasing the transmission quantity. With this WDM optical transmission system, WDM optical signals are amplified together in the optical amplification repeater and transmitted. As the optical amplifier for the repeater, for example, an erbium (Er)-doped optical fiber amplifier (EDFA) is widely used.

However, gain characteristics of this EDFA have generally wavelength dependency based on the composition of a base material of optical fiber, and hence the gain characteristics do not become completely flat gain wavelength characteristics in the wavelength band of such as from 1.5 $\mu$m to 1.6 $\mu$m, which is used in the long-distance optical transmission. Therefore, when the number of optical amplification repeaters are increased, the wavelength dependency is increased, thereby causing a problem in that a deviation in signal-to-noise ratio of light (optical SNR) is increased between each wavelength (channel).

As a conventional technique for solving such a problem, there is known a technique in which, for example, an etalon-type optical element (optical filter) having transmission (or loss) wavelength characteristics opposite to the gain wavelength characteristics of the EDFA is inserted in the optical amplifier or on the optical transmission line as a gain equalizer (GEQ), to flatten the gain wavelength characteristics (specifically, see "Gain Equalization of Er-doped Fiber Amplifier using Etalon Filter" Takeda, et al., The Institute of Electronics, Information and Communication Engineers, 1995 Autumn General Meeting, B-759, and "Development of Etalon-type Gain Flattening Filter", Mizuno et al., Furukawa Electric Review No. 105, January 2000).

Furthermore, in a wavelength equalizing apparatus described in Japanese Unexamined Patent Publication No. 11-162032, there is proposed a technique in which parameters of a plurality of optical filters each having periodic transmission wavelength characteristics are determined by Fourier series expansion of wavelength characteristics inverse to given wavelength characteristics, and these optical filters are serially connected to thereby compensate for the wavelength characteristics.

It is known that the gain wavelength characteristics of the above described EDFA are varied depending on the fluctuation of ambient temperature. In the erbium-doped optical fiber (EDF), further, the composition of the base material, particularly, variations in the concentration of additive such as aluminum (Al) may occur in the manufacturing process, and hence the gain wavelength characteristics of the EDFA may be varied depending on the concentration of Al. The gain wavelength characteristics of the EDFA are also varied when a control for maintaining an output light level constant (output fixing control: ALC) is being performed by changing the gain, in the case where an input light level is fluctuated.

It is desired that the transmission wavelength characteristics of the above described gain equalizer can be variably controlled, with respect to such changes of the gain wavelength characteristics of the EDFA. However, with the etalon-type optical filter used in the conventional gain equalizer, it is difficult to flexibly change the loss wavelength characteristics of the gain equalizer, corresponding to the change of the gain wavelength characteristics of the EDFA, since the transmission wavelength characteristics are fixed by the distance between the parallel reflection films constituting the Fabry-Perot interferometer, the reflectance of each reflection film or the like.

The present applicant has disclosed a variable optical filter utilizing the magneto-optical effect in Japanese Unexamined Patent Publication No. 11-212044, and has proposed a technique for constructing a gain equalizer or the like by connecting the above described variable optical filters in multi-stages, in Japanese Unexamined Patent Publication No. 12-137604. The variable optical filter used in this gain equalizer or the like is different from the above described etalon-type optical filter, but is an optical element in which the shape of the transmission wavelength characteristics which change periodically is made variable, by using a Faraday rotator. As the technique related to an optical element using the Faraday rotator, there are known other various techniques which are disclosed in Japanese Unexamined Patent Publications No. 61-279806, No. 11-14939, No. 9-21608, and No. 59-151065.

When such variable optical filters which use the Faraday rotator are connected in multiple stages to constitute a gain equalizer or the like, the above described Fourier series expansion method is effective as one method of designing the transmission wavelength characteristics of each variable optical filter. However, it is not so easy to realize a variable optical filter having transmission wavelength characteristics which are matched with the "sine" function of each term expanded by the Fourier series with high accuracy, only by using the magneto-optical effect.

Therefore, the present applicant has proposed a technique for providing a structure that operates as an etalon (Fabry-Perot interferometer) with a variable optical filter using a Faraday rotator, to make a periodic transmission wavelength characteristic variable (Japanese Patent Application No. 2002-70870). According to this prior application, it has become possible to change a transmission wavelength characteristic in an axial direction of transmissivity according to a Faraday rotation angle given to an optical element. Therefore, it becomes possible to realize a transmission wavelength characteristic matched with a gain wavelength characteristic of an EDFA with high accuracy. However, in the abovementioned prior application, although it is possible to change the periodic transmission wavelength characteristic in the axial direction of the transmissivity, it has not been possible to change a periodic characteristic thereof. In the case where matching of the transmission wavelength characteristic is required to be performed with higher accuracy, it is desirable to also make the periodic characteristic with respect to the wavelength variable.

In this specification, "equalization" means that undesirable transmission wavelength characteristics are compensated so that they become the same or approximately same characteristics as desirable transmission wavelength characteristics.

SUMMARY OF THE INVENTION

The present invention has been accomplished in view of the abovementioned problems and has an object to, by using an etalon type structure, easily realize an optical element, capable of changing a periodic transmission wavelength characteristic in an axial direction of transmissivity, and also changing a periodic characteristic with respect to a wavelength, and to provide a wavelength characteristic variable apparatus, an optical amplifier and an optical transmission system using such an optical element.

In order to achieve the above object, a transmission wavelength characteristics variable optical element according to the present invention comprises: a light reflection section including a mutually parallel first reflecting plane and second reflecting plane, to constitute a Fabry-Perot interferometer with respect to incident light, a polarization rotating section rotating to output a polarization direction of light reflected between the first reflecting plane and the second reflecting plane, and a reflecting plane moving section changing a distance between the first reflecting plane and the second reflecting plane.

In the optical element of such a construction, the light entering between one reflecting plane of the light reflection section is reflected at each reflecting plane while the polarization direction thereof is rotated by the polarization rotating section, so that transmitted light and light interfered with reflection light are output from the other reflecting plane. As a result, the present optical element operates as a Fabry-Perot interferometer. At this time, a light interference phenomenon occurs corresponding to the polarization of the lights spatially overlapping each other. Therefore, by changing a rotation angle in the polarization direction, it becomes possible to change a periodic transmission wavelength characteristic by the Fabry-Perot interferometer in an axial direction of transmissivity. Also, it becomes possible to change a periodic characteristic of the transmission wavelength characteristic by changing a distance between the first and the second reflecting planes by the reflecting plane moving section.

In the abovementioned transmission wavelength characteristics variable optical element, the polarization rotating section may include: a pair of magneto-optic crystals of wedge shape with equal apex angles, arranged to be in close contact at taper surfaces thereof; a fixed magnetic field generating section that gives a fixed magnetic field to the pair of magneto-optic crystals; a variable magnetic field generating section that gives a variable magnetic field to the pair of magneto-optic crystals in a different direction to that of the fixed magnetic field; and a variable magnetic field control section that controls the variable magnetic field generated by the variable magnetic field generating section. Also, the light reflection section may include reflection films respectively formed on a light incident plane and a light emitting plane parallel to each other of each of the pair of magneto-optic crystals, and the reflecting plane moving section may include movable sections that relatively move the pair of magneto-optic crystals while holding the respective taper surfaces in close contact, to change a distance between the respective reflection films.

In such a constitution, the pair of magneto-optic crystals of wedge shape are arranged to be in close contact at the taper surfaces, to thereby form a plane parallel plate, and the reflection films are formed on parallel planes of the parallel plate so that the incident light is multireflected. At this time, the rotation angle in the polarization direction of the light multireflected within the magneto-optic crystals is changed according to a synthetic magnetic field formed by the fixed magnetic field and the variable magnetic field. Also, the distance between the reflection films is changed according to the relative locations of the pair of magneto-optic crystals. Consequently, it becomes possible to change the periodic transmission wavelength characteristic by changing an application condition of the variable magnetic field by the variable magnetic field control section and also it becomes possible to change the periodic characteristic by relatively moving the pair of magneto-optic crystals by the movable section.

The wavelength characteristics variable apparatus according to the present invention is a wavelength characteristics variable apparatus using the above described transmission wavelength characteristics variable optical element, which comprises: a first optical device that determines the polarization of light entering into the transmission wavelength characteristics variable optical element, a second optical device that cuts out specific polarized light from the light emitted from the transmission wavelength characteristics variable optical element, and a variable Faraday rotator that is arranged between the first optical device and the second optical device, and gives a Faraday rotation angle according to the rotation angle given to the transmitted light by the transmission wavelength characteristics variable optical element.

In the wavelength characteristics variable apparatus having such a construction, the polarizations of the incident light and the emitting light with respect to the transmission wavelength characteristics variable optical element are determined by the first optical device and the second optical device, and also the rotation angle in the polarization direction given by the transmission wavelength characteristics variable optical element is compensated by the variable Faraday rotator. Thereby, it becomes possible to realize a polarization independent type wavelength characteristics variable apparatus, in which the transmissivity in the transmission wavelength characteristics variable optical element does not depend on the polarization of input light.

The optical amplifier according to the present invention comprises the above described wavelength characteristics variable apparatus, and equalization of gain wavelength characteristics is performed by the wavelength characteristics variable apparatus. According to such a construction, even if a change of gain wavelength characteristics occurs due to temperature change or the like, transmission wavelength characteristics of the wavelength characteristics variable apparatus is adjusted according to such a change, so that the gain wavelength characteristics can be actively equalized.

One aspect of the optical transmission system according to the present invention is an optical transmission system that transmits an optical signal from an optical sender to an optical receiver via an optical transmission line, wherein the above described wavelength characteristics variable apparatus according to the present invention is provided on the optical transmission line. Another aspect of the optical transmission system according to the present invention is an optical transmission system that repeatedly transmits an optical signal from an optical sender to an optical receiver via an optical transmission line and an optical repeater, wherein the optical repeater includes the above described optical amplifier according to the present invention.

According to the optical transmission system having such a construction, the wavelength dependency of the optical signal transmitted from the optical sender to the optical receiver is compensated (equalized) by the optical repeater comprising the wavelength characteristics variable apparatus according to the present invention which is arranged on the optical transmission line, or the optical amplifier according to the present invention. As a result, it becomes possible to receive the optical signal in which the optical SNR is equalized at the optical receiver.

Other objects, features and advantages of the invention will become apparent from the following description of embodiments, in conjunction with the appended drawings.

DETAILED DESCRIPTION OF THE INVENTION

Hereunder is a description of embodiments of the present invention with reference to the drawings.

Figure 1:
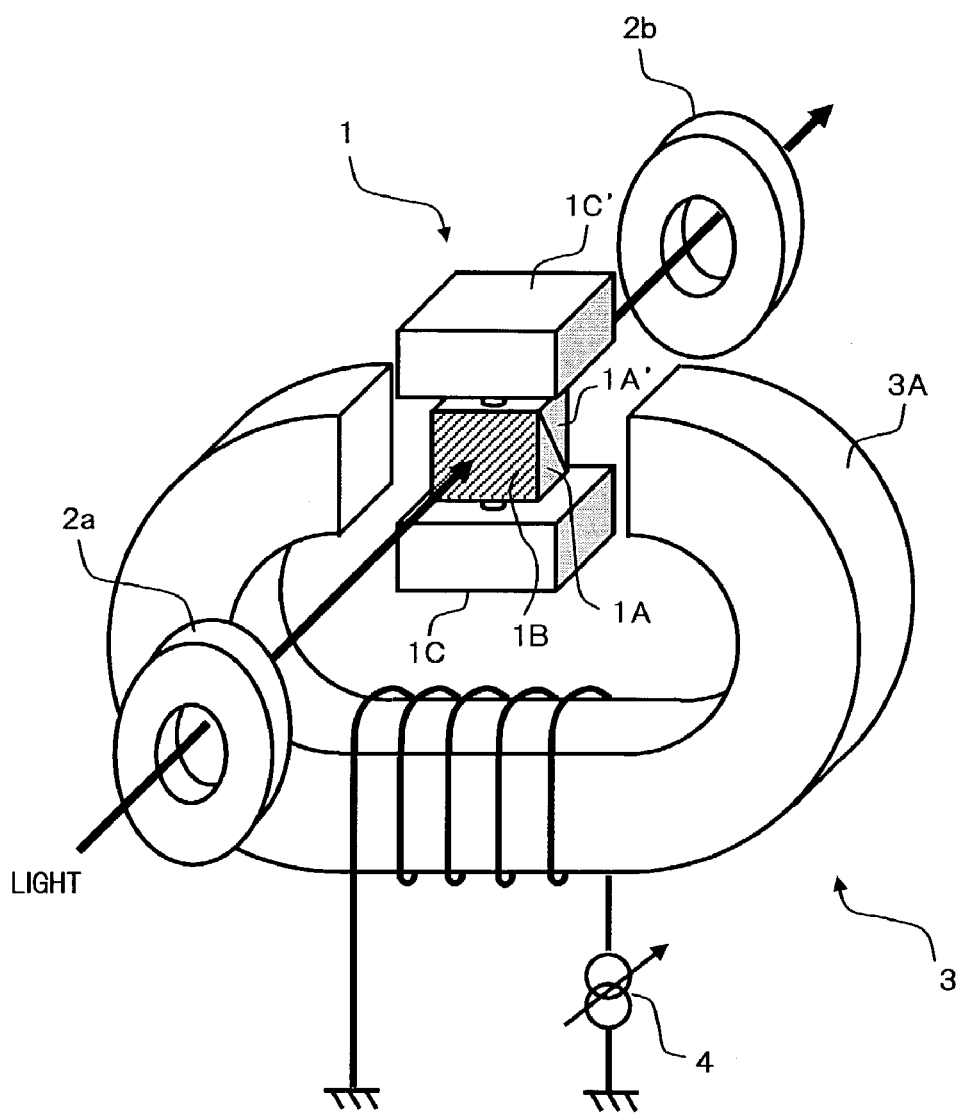
FIG. 1 is a perspective view showing the basic construction of a transmission wavelength characteristics variable optical element, according to a first embodiment of the present invention.

FIG. 1 is a perspective view showing the basic construction of a transmission wavelength characteristics variable optical element, according to a first embodiment of the present invention.

In FIG. 1, the optical element has, for example, a light interference section 1 having a magneto-optic crystal provided with a function as an etalon (Fabry-Perot interferometer), permanent magnets 2a and 2b, and an electromagnet 3 for applying magnetic fields to the light interference section 1 in directions orthogonal to each other, and a variable current source 4 for providing a drive current to the electromagnet 3.

Figure 2:
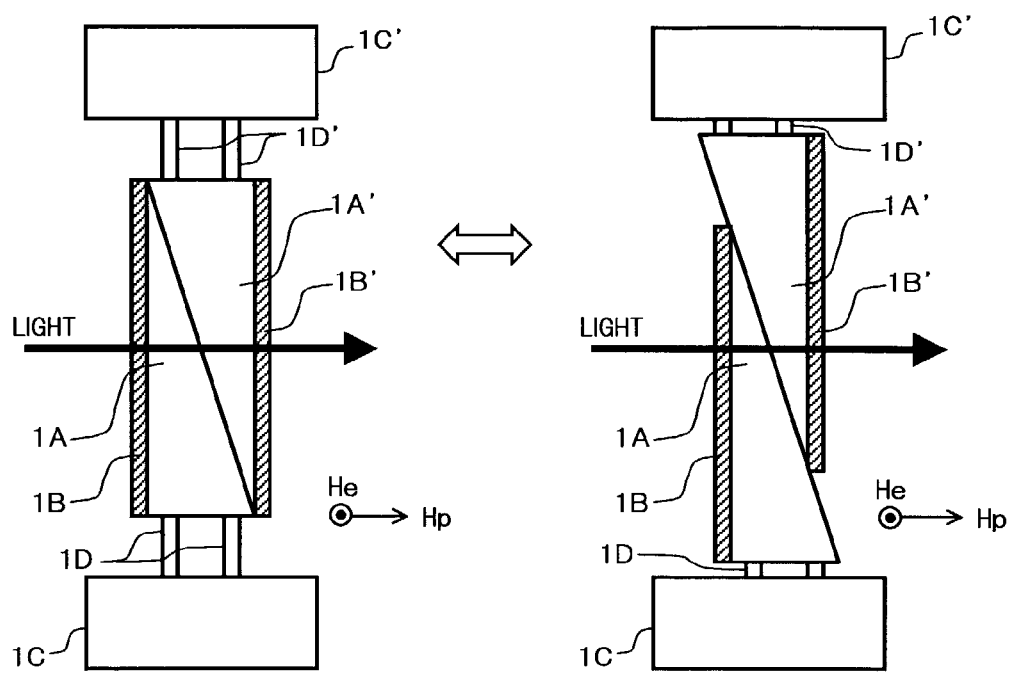
FIG. 2 is a lateral cross-section diagram of a light interference section in the first embodiment.

The light interference section 1 includes, for example as shown in a lateral cross-section diagram of FIG. 2, a pair of magneto-optic crystals 1A and 1A' formed in wedge shapes, reflection films 1B and 1B' formed on mutually parallel planes of the magneto-optic crystals 1A and 1A', movable sections 1C and 1C' that change a distance between the reflection films 1B and 1B' by relatively moving the respective magneto-optic crystals 1A and 1A', and support members 1D and 1D'.

The magneto-optic crystals 1A and 1A' are obtained by processing well known magneto-optic crystals each giving a variable Faraday rotation angle to light being transmitted therethrough, into wedge shapes with mutually equal apex angles. Here, taper surfaces of the pair of the magneto-optic crystals 1A and 1A' are arranged so as to be mutually in close contact, to form a single plane parallel plate. The magneto-optic crystals 1A and 1A' are respectively fixed to one ends of each of the support members 1D and 1D' at planes thereof opposite to the apex angles, and can be relatively moved while holding the taper surfaces in close contact with each other, by drive controls by the movable sections 1C and 1C' that are provided on the other ends of each of the support members 1D and 1D'. Faraday rotation given to transmitted light in the pair of magneto-optic crystals 1A and 1A' described above, is in general a phenomenon in which, when light passes through inside a magneto-optic crystal in a state where the magneto-optic crystal is in a certain magnetic field, a polarization direction of the light is always rotated in a fixed direction irrespective of a propagation direction of the light. The degree of the rotation angle in the polarization direction (Faraday rotation angle) depends on a direction and an intensity of magnetization of the magneto-optic crystal, which are generated by an applied magnetic field.

The reflection films 1B and 1B' comprise, for example, dielectric multi-layers or the like, having required reflectance, and constitute a so called Fabry-Perot interferometer that multireflects light incident on a parallel plane of the magneto-optic crystal 1A between the parallel planes of the magneto-optic crystals 1A and 1A' to output the mutually interfered light. The reflection films 1B and 1B' may be formed of films each having different reflectance.

Figure 3:
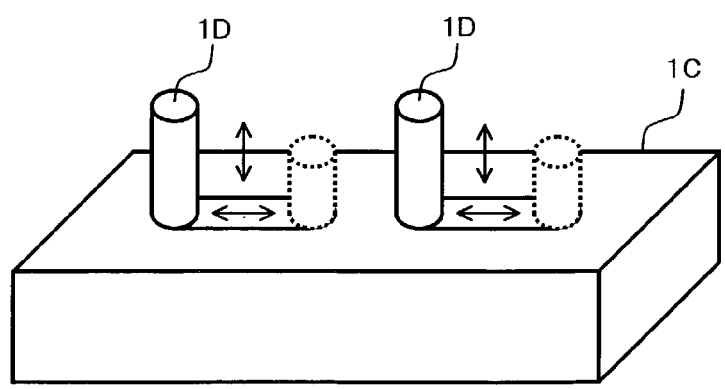
FIG. 3 is a perspective view showing a specific example of a movable section in the first embodiment.

The movable sections 1C and 1C' support the magneto-optic crystals 1A and 1A' at required locations via the support members 1D and 1D', and also relatively move the support locations, to thereby change a distance between the magneto-optic crystals 1A and 1A' as shown on the left and right in FIG. 2, while keeping the parallelism of a space where light is multireflected. More specifically, the movable section 1C, for example as shown in a perspective view of FIG. 3, can vertically interlock the support members 1D comprising two screws and the like, and at the same time a base portion of each support member 1D is mounted to the movable section 1C with the degree of freedom in a horizontal direction. Hence, the movable section 1C can freely move the magneto-optic crystal 1A in the respective vertical and horizontal directions within a required range via the support member 1D. Since the specific construction of the movable section 1C' is a vertically inverted construction of the movable section 1C, the description thereof is omitted here.

Figure 4:
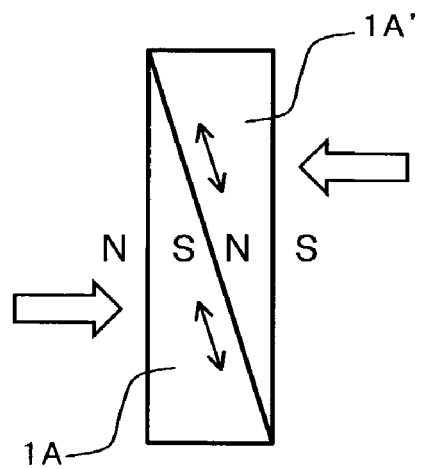
FIG. 4 is a conceptual diagram showing magnetic forces acting on a pair of magneto-optic crystals in the first embodiment.

In the case where, by the drive controls by the above-mentioned movable sections 1C and 1C', for example the pair of magneto-optic crystals 1A and 1A' are moved from the state shown on the left in FIG. 2 to the state shown on the right in FIG. 2, the movable section 1C moves each support member 1D downwards, while the movable section 1C' moves each support member 1D' upwards. As a result, the pair of magneto-optic crystals 1A and 1A' are moved in a direction to become apart vertically from each other. However, in each of the magneto-optic crystals 1A and 1A' at this time, for example as shown in a conceptual diagram of FIG. 4, a north pole and a south pole are respectively generated by a magnetic field applied by the permanent magnets 2a and 2b. Therefore, a magnetic force is applied in a direction to attract the magneto-optic crystals 1A and 1A' to each other. Since the respective movable sections 1C and 1C' and the base portions of each of the support members 1D and 1D' have the degree of freedom in the horizontal direction, then due to this magnetic force, the support members 1D fixed to the magneto-optic crystal 1A move to the right, while the support members 1D' fixed to the magneto-optic crystal 1A' move to the left. As a result, the pair of the magneto-optic crystals 1A and 1A' are moved in opposite directions while holding their taper faces in close contact with each other, so that the distance therebetween is shortened while keeping the parallelism of the light multireflection planes.

The permanent magnets 2a and 2b apply a fixed magnetic field Hp in the parallel direction with respect to the propagation direction of light (ray direction) entering into the light interference section 1. It is assumed that this fixed magnetic field Hp provides a magnetic field sufficient for saturating the magnetization of the pair of magneto-optic crystals 1A and 1A'. These permanent magnets 2a and 2b may be electromagnets. When electromagnets are used, the saturation magnetic field or variable magnetic field may be provided by these electromagnets.

The electromagnet 3 applies a variable magnetic field He of the strength corresponding to a current value of the variable current source 4, perpendicularly to the ray direction of the incident light. Therefore, the direction and strength of the synthetic magnetic field Hp+He of the fixed magnetic field Hp and the variable magnetic field He are changed by adjusting the current value of the variable current source 4. A yoke 3A of the electromagnet 3 is previously designed in a form capable of ensuring a space for storing the light interference section 1 therein. Specifically, it is designed so that a cavity area located in the center of C-shape is relatively large. Also in the case where the yoke 3A with the cavity area enlarged in this way, is used to constitute the electromagnet 3, since a magnetic field generated by a current flowing in a coil is transmitted through the yoke, the intensity of the variable magnetic field He to be applied to the pair of the magneto-optic crystals 1A and 1A' is not changed depending on the form of the yoke.

One example is shown here, in which the variable magnetic field is applied to the pair of magneto-optic crystals 1A and 1A' by the combination of the permanent magnets 2a and 2b, and the electromagnet 3, but the magnetic field application method in the present invention is not limited thereto. Further, the fixed magnetic field and the variable magnetic field are applied in directions orthogonal to each other, but the direction of each magnetic field may be set so as to be different to each other, not only in the orthogonal direction.

The transmission wavelength characteristics of the optical element having the basic construction described above will be described.

Figure 5:
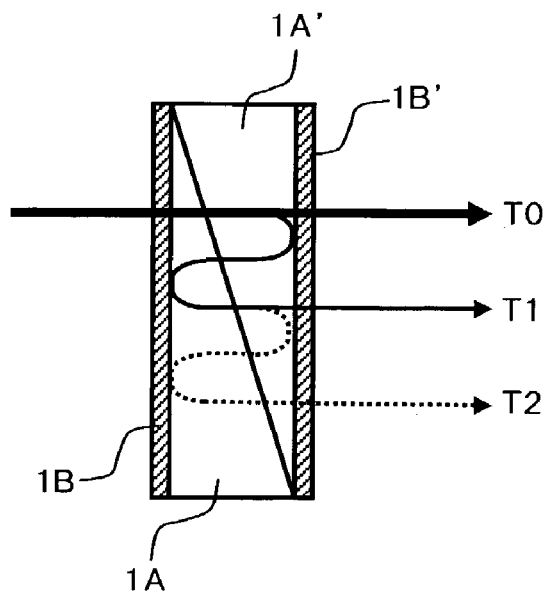
FIG. 5 is a schematic diagram showing a state of multireflection of light in the light interference section in the first embodiment.
Figure 6:
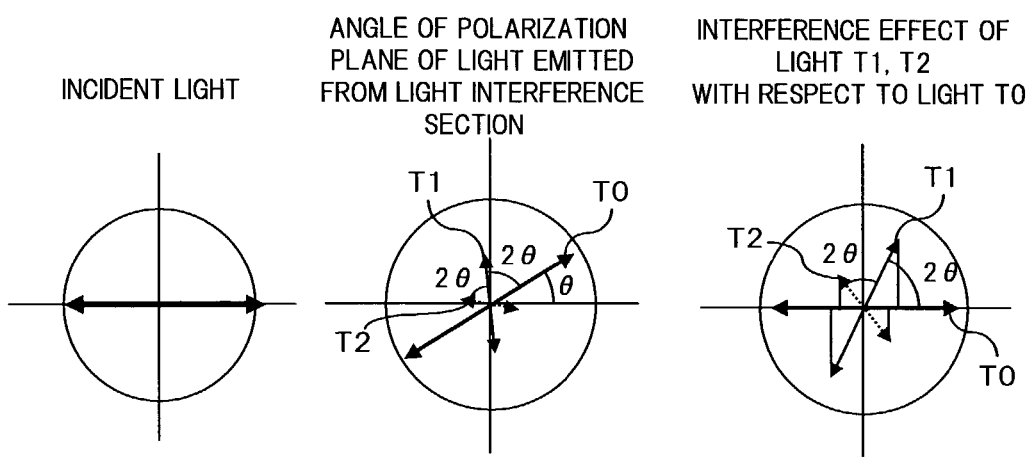
FIG. 6 is a diagram for explaining a Faraday rotation angle of each light multireflected in FIG. 5.
Figure 7:
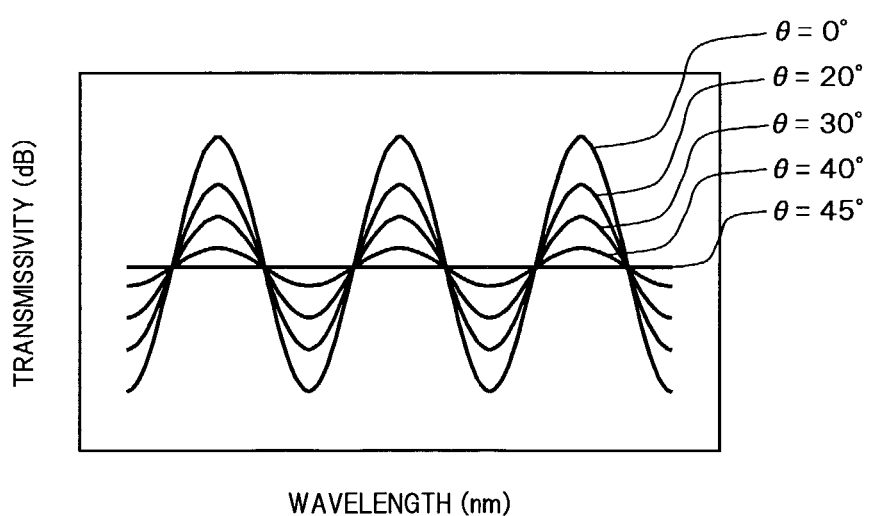
FIG. 7 is a diagram showing transmission wavelength characteristics in FIG. 5 according to Faraday rotation angle.
Figure 8:
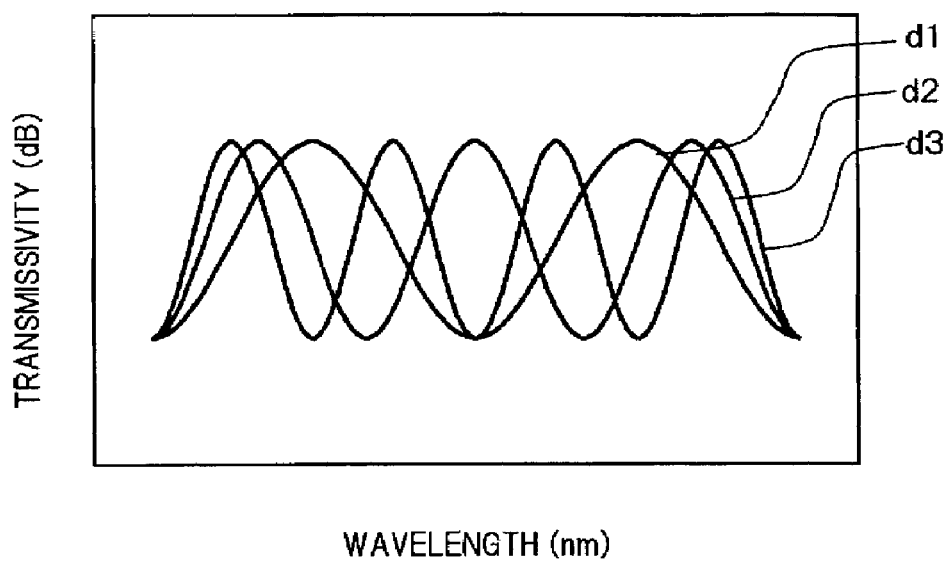
FIG. 8 is a diagram showing the transmission wavelength characteristics in FIG. 5 according to a distance between reflecting planes.

FIG. 5 is a schematic diagram showing a state of multiple reflection of light in the light interference section 1 of the present optical element. Further, FIG. 6 is a diagram for explaining a Faraday rotation angle of each of the multireflected lights. Furthermore, FIG. 7 is a diagram showing the transmission wavelength characteristics of the present optical element corresponding to the Faraday rotation angle. In addition, FIG. 8 is a diagram showing the transmission wavelength characteristics of the present optical element corresponding to a distance between reflecting planes.

In this optical element, when light enters into the light interference section 1, the incident light is multireflected to interfere with each other, while the polarization direction thereof is rotated in a certain direction due to the Faraday rotation within the pair of magneto-optic crystals 1A and 1A'. The interference phenomenon of the light at this time is such that in the spatially overlapped light, the interference phenomenon occurs most largely with respect to the light whose polarization is in the same direction, and does not occur with respect to the light whose polarization is in the orthogonal direction. Therefore, for the multireflected lights emitted from the light interference section 1, the polarization directions thereof are different to each other corresponding to the Faraday rotation angle provided in the pair of magneto-optic crystals 1A and 1A'. As a result, the effect of the optical interference is reduced compared to the conventional etalon which does not provide the Faraday rotation angle.

Specifically, in FIG. 5, it is assumed that the light having been transmitted through the pair of magneto-optic crystals 1A and 1A' without being reflected therein is T0, the light reflected once by each of the reflection films 1B, 1B' at the edges of the crystal (total twice) and then emitted is T1, the light reflected twice by each of the reflection film 1B, 1B' at the edges of the crystal (total four times) and then emitted is T2, and the Faraday rotation angle provided while the light is propagated from one reflection film 1B to the other reflection film 1B is θ. Then, a polarization direction of each of the lights T0, T1 and T2 becomes such that as shown in the middle of FIG. 6, the polarization direction of the light T0 is θ, the polarization direction of the light T1 is 3θ(=θ+2θ), and the polarization direction of the light T2 is 5θ(=θ+2θ+2θ), with respect to the polarization direction of the light entered into the pair of magneto-optic crystals 1A and 1A' shown on the left hand side of FIG. 6.

The interference effect of the light T1 with respect to the light T0 occurs, as shown on the right hand side of FIG. 6, corresponding to a component (cos2θ component) in which a vector expressed by making the amplitude (strength) of the light T1 correspond to the polarization direction is projected in the polarization direction of the light T0. The interference effect of the light T2 with respect to the light T0 also occurs corresponding to a component (cos4θ component) in which a vector expressed by making the amplitude of the light T2 correspond to the polarization direction is projected in the polarization direction of the light T0. Moreover, each amplitude (strength) of the light T1 and the light T2 is decreased in proportion to the product of the square of the reflection frequency and the reflectance. Therefore, when the reflectance of the reflection film 1B is not higher than 50%, the strength of the light T2 having the reflection frequency of four times only reaches about 6% at most with respect to the strength of the light T0. Hence, the interference effect of the light T0 and the light T1 becomes predominant with respect to the transmission wavelength characteristics due to the multiple reflection.

The interference effect of the multireflected light in the present optical element becomes maximum, as shown in one example of FIG. 7, at the Faraday rotation angle θ=0°, at which the polarization direction of each light becomes parallel, and transmission wavelength characteristics similar to those of the typical etalon can be obtained. By gradually increasing the Faraday rotation angle θ, the interference effect of the light T0 and the light T1 is reduced, and when the Faraday rotation angle θ becomes 45°, at which each polarization direction of the light T0 and the light T1 becomes orthogonal to each other, the interference effect becomes substantially zero, and the transmission wavelength characteristics become flat.

As described above, according to the present optical element, it becomes possible to vary the periodic transmission wavelength characteristics caused by the interference phenomenon of light multireflected between the reflection films 1B, 1B' in the axial direction of the transmissivity thereof, by adjusting the current value of the variable current source 4 to change the Faraday rotation angle θ in the pair of magneto-optic crystals 1A and 1A'.

Further, when it is assumed that the wavelength of light is λ, a refractive index of the pair of magneto-optic crystals 1A and 1A' is n, and a distance between the reflection films 1B, 1B' is d, the period characteristic in the variable transmission wavelength characteristics with respect to the wavelength, that is, the free spectral range (FSR) can be given by the following equation (1).

$$FSR = \lambda^2/(2nd) \qquad (1)$$

Consequently, in order to make the periodic characteristic of the transmission wavelength characteristic for this optical element variable, the refractive index of the magneto-optic crystals 1A and 1A' may be changed, or the distance "d" between the reflection films 1B and 1B' may be changed. Here, as mentioned above, the magneto-optic crystals 1A and 1A' are relatively moved by the movable sections 1C and 1C' via the support members 1D, 1D', to adjust the distance between the reflection films 1B and 1B', so that, for example as shown in an example of FIG. 8, the periodic characteristic of the transmission wavelength characteristic is made variable. In FIG. 8, there is shown the example of the transmission wavelength characteristic in the case where the distance between the reflection films 1B and 1B' is changed to d1, d2 and d3 (where d1<d2<d3) with respect to a constant Faraday rotation angle.

As described above, in the present optical element, by controlling the current value of the variable current source 4 to adjust the Faraday rotation angle θ in the pair of magneto-optic crystals 1A and 1A', it is possible to change the periodic transmission wavelength characteristic in the axial direction of the transmissivity. Also, by relatively moving the magneto-optic crystals 1A and 1A' by the movable sections 1C and 1C' to adjust the distance "d" between the reflection films 1B and 1B', it is possible to change the periodic characteristic of the transmission wavelength characteristic. As a result, in the present optical element, it is possible to adjust the periodic transmission wavelength characteristic over a wider range compared to the conventional technique.

In addition, in the present optical element, the reflectance of the reflection films 1B and 1B' formed on the magneto-optic crystals 1A and 1A' is designed so as to be within an appropriate range. As a result, it is possible to approximate the transmission wavelength characteristic to a sine function with relatively high accuracy. If an amplitude of such a transmission wavelength characteristic or the FSR is adjusted according to the Faraday rotation angle θ or the distance "d" between the reflection films 1B and 1B', it is possible to easily realize an optical element that matches highly accurately with the transmission wavelength characteristics designed by using the known Fourier series expansion method described above. Specifically, in order to approximate the transmission wavelength characteristics of the optical element to the "sine" function with high accuracy, it is desired to set the reflectance of the reflection films 1B, 1B' in the range of, for example, from 5% to 50% inclusive. The reflectance of the reflection films used in the present invention is not limited to the above range. However, since it is necessary that the reflection film in the present invention can generate significant reflection, it does not include, for example, a film having a reflectance of 0.1% or less, which is generally used as an anti-reflection film.

A wavelength characteristics variable apparatus using the transmission wavelength characteristics variable optical element according to the present invention will now be described.

Figure 9:
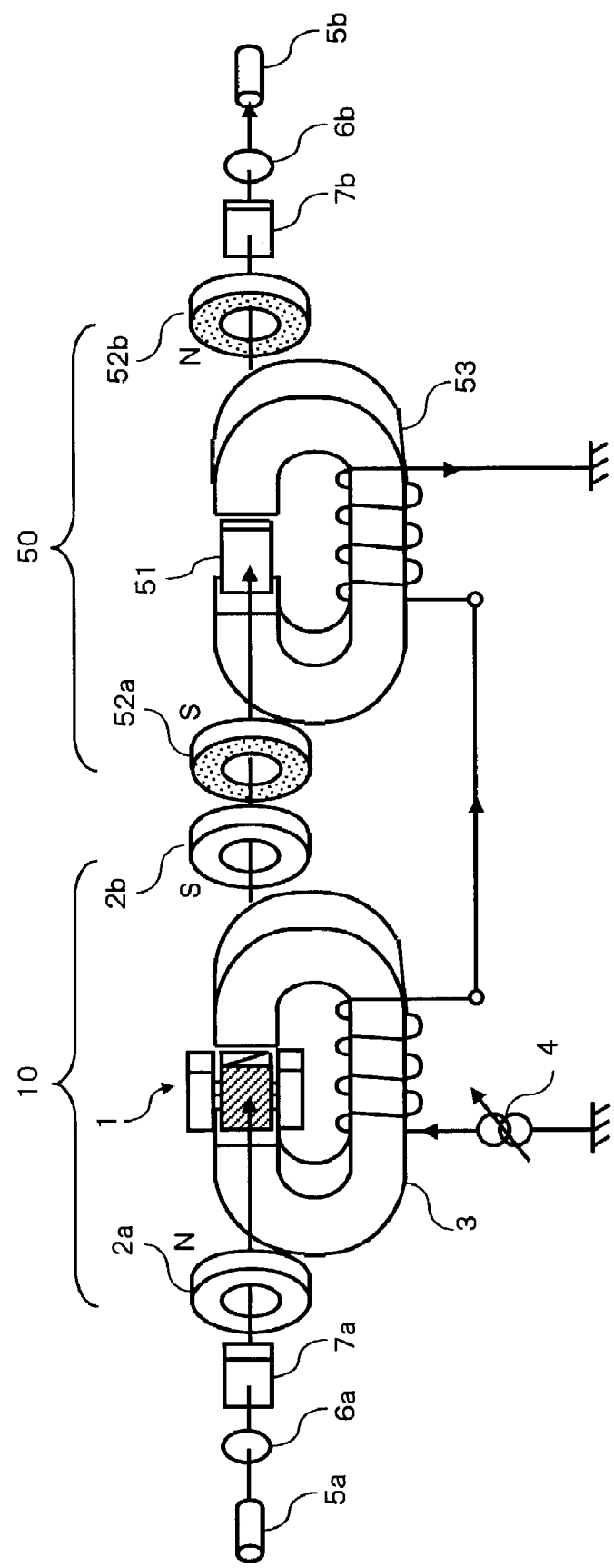
FIG. 9 is a perspective view showing a constitution of a wavelength characteristic variable apparatus according to a second embodiment of the present invention.
Figure 10:
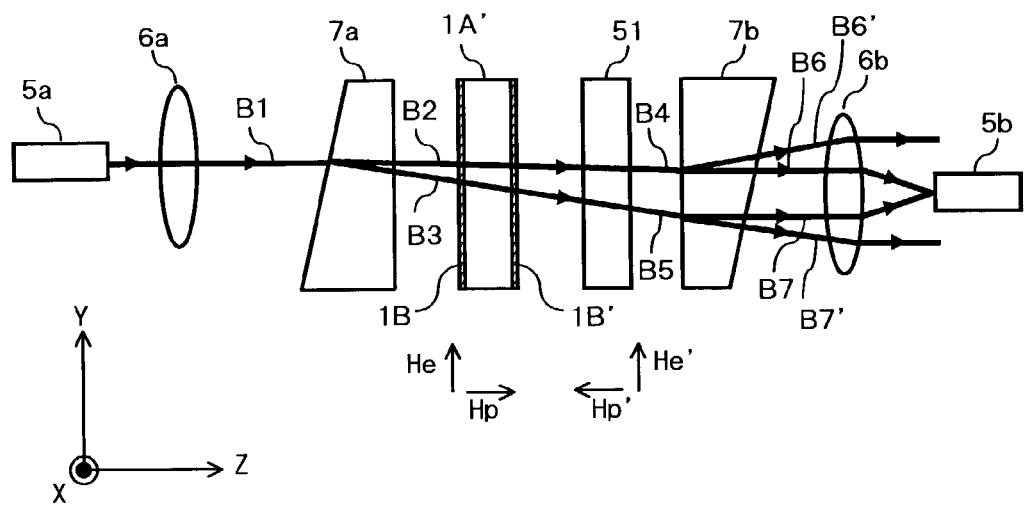
FIG. 10 is a plan view showing a magneto-optic system in the second embodiment.

FIG. 9 is a perspective view showing the construction of a wavelength characteristics variable apparatus according to a second embodiment of the present invention. FIG. 10 is a plan view showing a magneto-optic system in FIG. 9. In FIG. 10, there is also shown the result of ray tracing. In FIG. 9 and FIG. 10, parts similar to the basic construction of the optical element shown in FIG. 1 are denoted by the same reference symbols, and the same applies in the other figures.

In FIG. 9 and FIG. 10, the present wavelength characteristics variable apparatus is constructed by arranging a first lens 6a, a first wedge plate 7a, an optical element 10 capable of varying wavelength transmission characteristics, a variable Faraday rotator 50, a second wedge plate 7b and a second lens 6b, in this order, in the ray direction of light emitted from a first optical fiber 5a.

The first lens 6a is a lens for changing (for example, collimating) a beam parameter of the light emitted from the first optical fiber 5a to supply it to the first wedge plate 7a. The second lens 6b is for collecting the beams from the second wedge plate 7b to combine the beams to a second optical fiber 5b.

The first wedge plate 7a and the second wedge plate 7b are taper plates comprising a birefringent material. The first wedge plate 7a separates the incident light in arbitrary polarization into two lights in linear polarization, and inputs the separated two lights to the optical element 10. The second wedge plate 7b receives the lights sent from the optical element 10 via the variable Faraday rotator 50, and changes the light having the polarization component identical to the optical axis (axis having a high refractive index) and the light having the polarization component identical to the axis orthogonal to the optical axis, to lights parallel with each other, to emit those lights to the lens 6b, and the lens 6b collects those lights. At this time, other lights (lights having polarization components other than the optical axis and the axis orthogonal to the optical axis) are diffused so as not to enter into the lens 6b. In order to achieve this, the top and the bottom of the first wedge plate 7a are arranged so as to face the bottom and the top of the second wedge plate 7b, respectively, and also the corresponding planes are arranged to be parallel with each other. Optical axes of the first wedge plate 7a and the second wedge plate 7b are respectively provided on planes consisting of X axis and Y axis at arbitrary angles. Light in the same polarization with respect to the transmission axes of the first wedge plate 7a and the second wedge plate 7b is defined as extraordinary rays, and light in perpendicular polarization is defined as ordinary rays.

The optical element 10 capable of varying wavelength transmission characteristics has the basic construction as shown in FIG. 1. Here, respective permanent magnets 2a and 2b are arranged so that the direction of the fixed magnetic field Hp to be applied to the pair of magneto-optic crystals 1A and 1A' in the light interference section 1 becomes the direction from the light incident side towards the light emitting side (positive direction of Z axis).

The variable Faraday rotator 50 is for restoring the polarization of an optical signal Faraday-rotated by the optical element 10, to the polarization of that before entering into the optical element 10, and a Faraday rotator having a known construction capable of changing the Faraday rotation angle is used. Here, for example as shown in FIG. 9, the variable Faraday rotator 50 includes a magneto-optic crystal 51 into which the light from the optical element 10 enters, and permanent magnets 52a and 52b and an electromagnet 53 for applying magnetic fields to the magneto-optic crystal 51 in directions orthogonal to each other, and the variable current source 4 of the optical element 10 is commonly used for providing a drive current to the electromagnet 53. The magneto-optic crystal 51 used for the variable Faraday rotator 50 is different from the pair of magneto-optic crystals 1A and 1A' used for the light interference section 1 of the optical element 10, wherein nothing is formed on the incident plane and the emitting plane of the light, or an anti-reflection film is formed thereon to suppress reflection of light. Therefore, in the magneto-optic crystal 51 of the Faraday rotator 50, multiple reflection of light does not occur, and only the variable Faraday rotation is given to the light being transmitted through the crystal. A Faraday rotation angle θ' given at this time is set such that the rotation direction thereof is opposite to that of the Faraday rotation angle θ given by the optical element 10, and the size becomes substantially equal to that of the Faraday rotation angle θ. Here, for example, the Faraday rotation angle θ' described above is realized by arranging each of the permanent magnets 52a and 52b so that the direction of a fixed magnetic field Hp' to be applied to the magneto-optic crystal 51 becomes opposite to the fixed magnetic field Hp in the optical element 10, that is, becomes the direction from the light emitting side towards the light incident side (negative direction of the Z axis).

In the wavelength characteristics variable apparatus having the above described construction, the light emitted from the first optical fiber 5a is collimated by the first lens 6a to become a parallel light beam. This parallel light beam is represented by a symbol B1 in FIG. 10, disregarding the thickness of the beam. The beam B1 is separated into a beam B2 corresponding to the ordinary ray and a beam B3 corresponding to the extraordinary ray in the first wedge plate 7a. The beam B2 and the beam B3 pass through the optical element 10 capable of varying transmission wavelength characteristics and the variable Faraday rotator 50, in this order, to become a beam B4 and a beam B5, respectively, and are sent to the second wedge plate 7b. At this time, the polarization of the beam B4 and the beam B5 is respectively restored to the polarization of the beam B2 and the beam B3, since the Faraday rotator 50 gives the Faraday rotation angle θ' by which the Faraday rotation angle θ given by the optical element 10 capable of varying transmission wavelength characteristics is offset.

In the second wedge plate 7b, the beam B4 is separated into a beam B6 corresponding to the ordinary ray and a beam B6' corresponding to the extraordinary ray. The beam B5 is also separated into a beam B7 corresponding to the extraordinary ray and a beam B7' corresponding to the ordinary ray in the second wedge plate 7b. When the history of refraction which the beam B6 and the beam B7 have respectively undergone, and the shape and arrangement configuration of each of the wedge plates 7a and 7b are taken into consideration, the beam B6 and the beam B7 become parallel with each other. Therefore, the beam B6 and the beam B7 are narrowed by the second lens 6b, and combined to the core end face of the second optical fiber 5b.

As described above, according to the wavelength characteristics variable apparatus in the second embodiment, it is possible to make the transmissivity in the transmission wavelength characteristics variable optical element, independent on the polarization of the input light. That is, it becomes possible to provide a polarization independent type wavelength characteristics variable apparatus using the transmission wavelength characteristics variable optical element.

A wavelength characteristics variable apparatus according to a third embodiment of the present invention will now be described.

Figure 11:
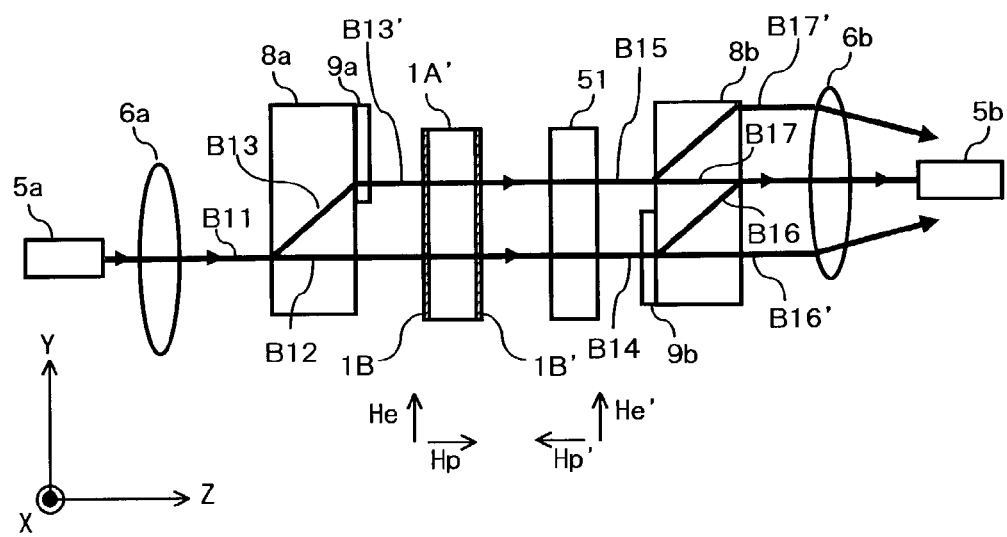
FIG. 11 is a plan view showing a magneto-optic system of a wavelength characteristic variable apparatus according to a third embodiment of the present invention.

FIG. 11 is a plan view showing a magneto-optic system in the wavelength characteristics variable apparatus of the third embodiment.

In FIG. 11, a part in which the construction of the magneto-optic system in the third embodiment is different from the construction of the magneto-optic system in the second embodiment shown in FIG. 10 is that a first flat plate 8a and a second flat plate 8b respectively comprising a birefringent material are used as the first optical device and the second optical device, instead of the first wedge plate 7a and the second wedge plate 7b. The other construction is the same as in the second embodiment shown in FIG. 9 and FIG. 10.

The first flat plate 8a and the second flat plate 8b have the same thickness in the Z axis direction, and for example, optical axes thereof are set to be parallel with each other, and inclined at 45° with respect to the Z axis. Moreover, the first flat plate 8a is provided with a λ/2 wave plate 9a, at a portion where the extraordinary ray is emitted (upper right portion of the first flat plate 8a in FIG. 11) on the plane facing the light interference section 1 of the optical element 10, and the second flat plate 8b is provided with a λ/2 wave plate 9b at a portion where the ordinary ray enters on the plane facing the magneto-optic crystal 51 of the Faraday rotator 50.

In the wavelength characteristics variable apparatus having the above described construction, the light emitted from the first optical fiber 5a is collimated by the first lens 6a to become a parallel light beam B11. This beam B11 is separated into a beam B12 corresponding to the ordinary ray and a beam B13 corresponding to the extraordinary ray in the first wedge plate 8a. The beam B13 corresponding to the extraordinary ray passes through the λ/2 wave plate 9a so that the polarization direction thereof is rotated by 90 degrees to become a beam B13', and the polarization direction of the beam B13' is arranged to be parallel with the polarization direction of the beam B12 corresponding to the ordinary ray. The propagation directions of the beam B12 and the beam B13' thus become parallel with each other. Then, the beam B12 and the beam B13' pass through the optical element 10 capable of varying transmission wavelength characteristics and the variable Faraday rotator 50, in this order, to become a beam B14 and a beam B15, respectively, and are sent to the second flat plate 8b. At this time, the polarization of the beam B14 and the beam B15 is restored, respectively, to the polarization of the beam B12 and the beam B13', since the Faraday rotator 50 gives the Faraday rotation angle θ' by which the Faraday rotation angle θ given by the optical element 10 capable of varying transmission wavelength characteristics is offset.

Since the optical axis of the second flat plate 8b is parallel with the optical axis of the first flat plate 8a, the beam B15 passes along the optical path of the beam B17 corresponding to the ordinary ray in the second flat plate 8b. On the other hand, the beam B14 passes through the λ/2 wave plate 9b so that the polarization direction thereof is rotated by 90 degrees, and then passes along the optical path of the beam B16 corresponding to the extraordinary ray in the second flat plate 8b. Since the first flat plate 8a and the second flat plate 8b have the same thickness in the direction of Z axis, with optical axes thereof being parallel with each other, the beam B16 is emitted from a position substantially coinciding with the beam B17. Therefore, the beam B16 and the beam B17 are narrowed by the second lens 6b, and combined to the core end face of the second optical fiber 5b.

As described above, according to the wavelength characteristics variable apparatus in the third embodiment, similar to the case of the second embodiment, it becomes possible to provide a polarization independent type wavelength characteristics variable apparatus using the transmission wavelength characteristics variable optical element. Also in the third embodiment, by respectively providing the λ/2 wave plates 9a and 9b so that the respective beams branched into the ordinary ray and the extraordinary ray by the first flat plate 8a pass along the optical paths of the extraordinary ray and the ordinary ray in the second flat plate 8b, respectively, it becomes possible to eliminate polarization mode dispersion in the wavelength characteristics variable apparatus.

When an influence of the polarization mode dispersion is small in the pair of magneto-optic crystals 1A and 1A', it is possible to omit the λ/2 wave plates 9a and 9b. Further, in FIG. 10 and FIG. 11, description has been made for the case in which the first optical device that determines the polarization of the light entering into the optical element and the second optical device that cuts out the light in a specific polarization from the light from the optical element, are the birefringent wedge plate and birefringent flat plate. However, since the first optical device needs only to bring the incident light into a specific polarization, a polarizer can be used as the first optical device. Further, since the second optical device needs only to cut out the specific polarization component from the light from the optical element, an analyzer can be used as the second optical device.

A wavelength characteristics variable apparatus according to a fourth embodiment of the present invention will now be described.

Figure 12:
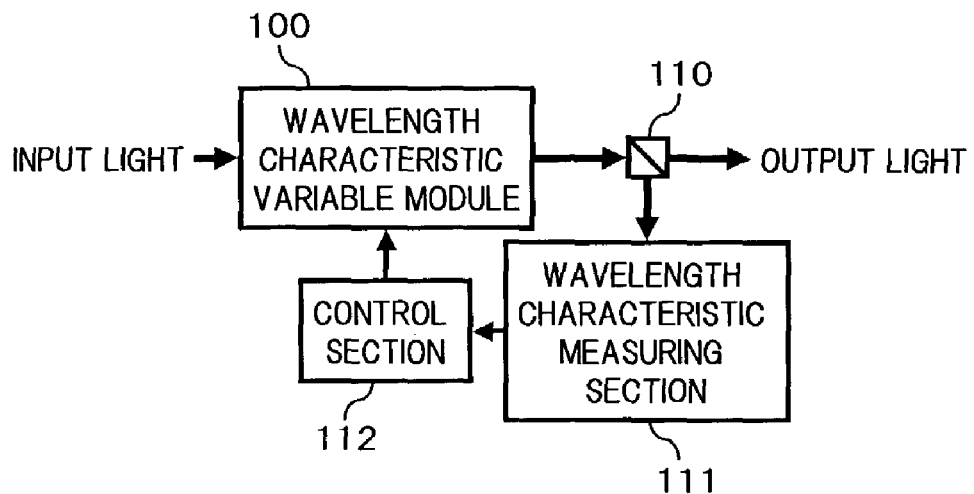
FIG. 12 is a functional block diagram showing the whole construction of a wavelength characteristic variable apparatus according to a fourth embodiment of the present invention.

FIG. 12 is a functional block diagram showing the whole construction of the wavelength characteristics variable apparatus according to the fourth embodiment.

In FIG. 12, the wavelength characteristics variable apparatus includes a wavelength characteristics variable module 100 obtained by modularization of a construction similar to that of the wavelength characteristics variable apparatus in the second or third embodiment, an optical branching device 110 that branches a part of output light from the wavelength characteristics variable module 100, a wavelength characteristics measuring section 111 that measures the wavelength characteristics of the branched light from the optical branching device 110, and a control section 112 that feedback controls transmission wavelength characteristics of the wavelength characteristics variable module 100.

In the wavelength characteristics variable apparatus described above, the light entering into the wavelength characteristics variable module 100 is equalized in accordance with the transmission wavelength characteristics corresponding to the current value of the variable current source 4, to be output to the optical branching device 110. The optical branching device 110 branches a part of the output light from the wavelength characteristics variable module 100 and sends the branched light to the wavelength characteristics measuring section 111 as a monitor light. The wavelength characteristics measuring section 111 measures the optical power with respect to wavelength for the monitor light branched by the optical branching device 110, and transmits the measurement result to the control section 112. The control section 112 adjusts the current value of the variable current source 4 in the wavelength characteristics variable module 100 so that the wavelength characteristics of the optical power measured by the wavelength characteristics measuring section 111 or the driving conditions of the movable sections 1C and 1C' are substantially flattened, thus feedback controlling the transmission wavelength characteristics of the wavelength characteristics variable module 100.

In this manner, according to the wavelength characteristics variable apparatus in the fourth embodiment, the wavelength characteristics of the light output from the wavelength characteristics variable module 100 is monitored, and the transmission wavelength characteristics of the wavelength characteristics variable module 100 is feedback controlled based on the monitoring result. As a result, a wavelength characteristics variable apparatus, which can stably output light having flat wavelength characteristics, can be realized.

In the above fourth embodiment, the transmission wavelength characteristics of the wavelength characteristics variable module 100 are feedback controlled, so that the wavelength characteristics of the monitor light measured by the wavelength characteristics measuring section 111 are flattened. However, the present invention is not limited thereto, and the transmission wavelength characteristics of the wavelength characteristics variable module 100 may be feedback controlled, so that the wavelength characteristics of the monitor light have a required wavelength profile.

Figure 13:
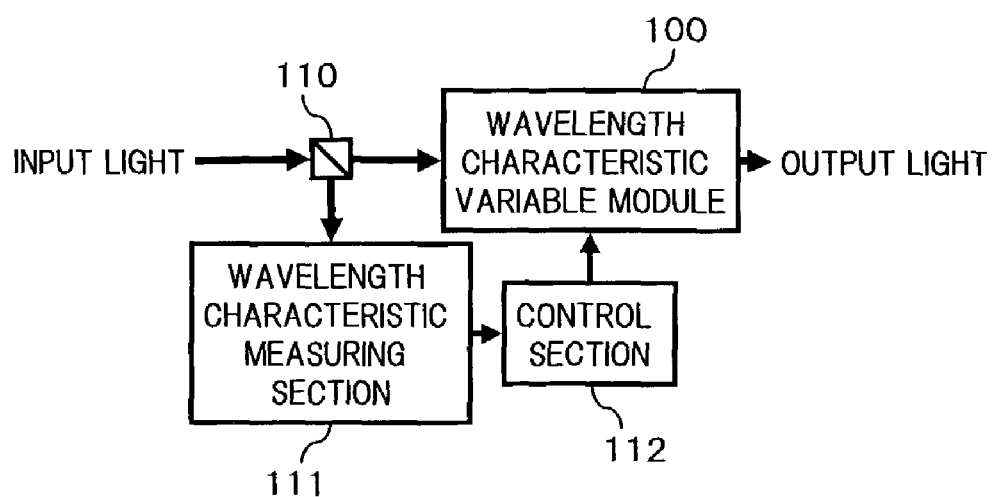
FIG. 13 is a functional block diagram showing another constitutional example related to the fourth embodiment.

Moreover, in the present invention, the wavelength characteristics of the light output from the wavelength characteristics variable module 100 are monitored to thereby perform the feedback control. However, the present invention is not limited thereto, and, for example as shown in FIG. 13, the optical branching device 110 may be provided on the input side of the wavelength characteristics variable module 100, to monitor the wavelength characteristics of the light input to the wavelength characteristics variable module 100, and based on the monitoring result, the transmission wavelength characteristics of the wavelength characteristics variable module 100 may be feedback controlled.

A wavelength characteristics variable apparatus according to a fifth embodiment of the present invention will now be described.

Figure 14:
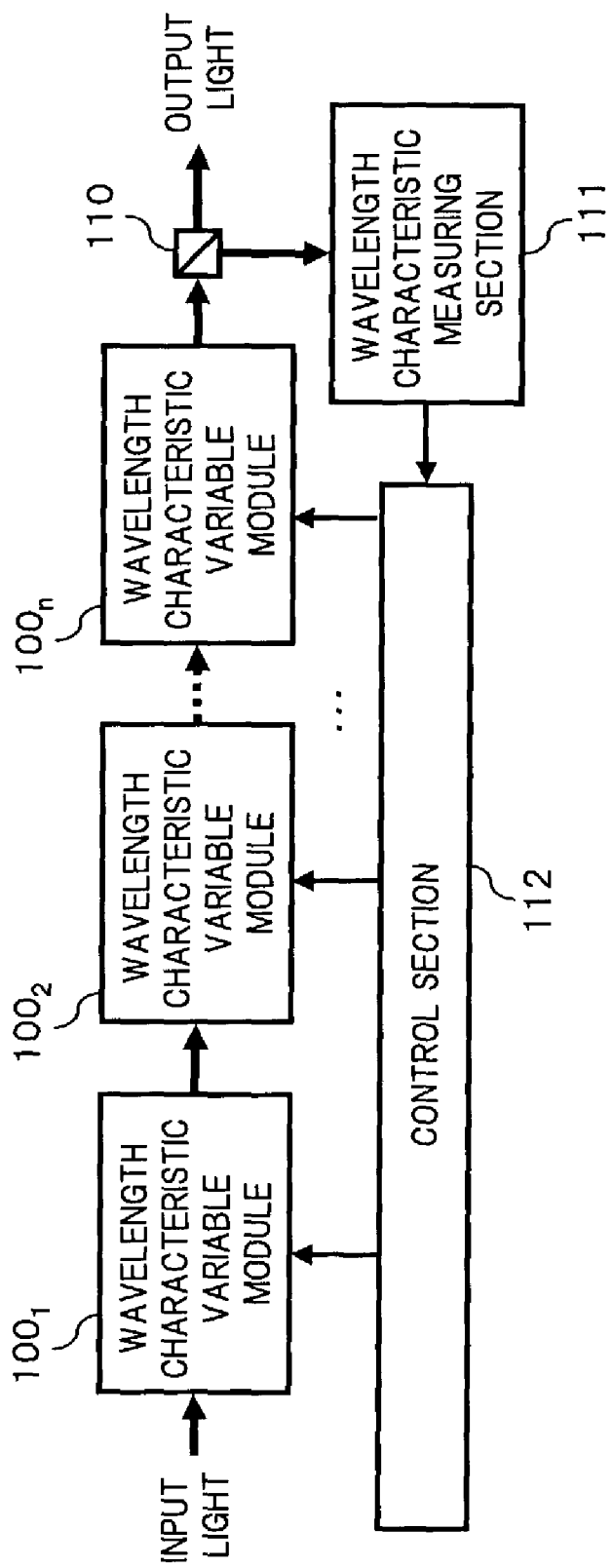
FIG. 14 is a functional block diagram showing the whole construction of a wavelength characteristic variable apparatus according to a fifth embodiment of the present invention.

FIG. 14 is a functional block diagram showing the whole construction of the wavelength characteristics variable apparatus according to the fifth embodiment.

In FIG. 14, the wavelength characteristics variable apparatus has a construction such that in the construction of the fourth embodiment shown in FIG. 12, a plurality of (herein, n in number) wavelength characteristics variable modules $100_1$ to $100_n$ are serially connected, the wavelength characteristics of the light output from the wavelength characteristics variable module $100_n$ of n-th stage are monitored using the optical branching device 110 and the wavelength characteristics measuring section 111, and based on the monitoring result, the transmission wavelength characteristics of each of the wavelength characteristics variable modules $100_1$ to $100_n$ are respectively feedback controlled by the control section 112.

The transmission wavelength characteristics of each of the wavelength characteristics variable modules $100_1$ to $100_n$ are designed such that the distance between the reflection films 1B and 1B' is adjusted so that the period with respect to the wavelength (FSR) is different from each other, and are set such that the sum of the transmission wavelength characteristics when all the wavelength characteristics variable modules $100_1$ to $100_n$ are combined together becomes a desired profile, by variably controlling the amplitude of each of the periodic wavelength characteristics corresponding to the current value of the variable current source 4.

According to the wavelength characteristics variable apparatus in the fifth embodiment, it becomes possible to realize transmission wavelength characteristics having a more complicated shape, by serially connecting a plurality of wavelength characteristics variable modules $100_1$ to $100_n$. Moreover, the wavelength characteristics of the light output from the wavelength characteristics variable module $100_n$ are monitored, and based on the monitoring result, the transmission wavelength characteristics of each of the wavelength characteristics variable modules $100_1$ to $100_n$ are respectively feedback controlled. As a result, it is possible to realize a wavelength characteristics variable apparatus which can output light having stable wavelength characteristics.

Figure 15:
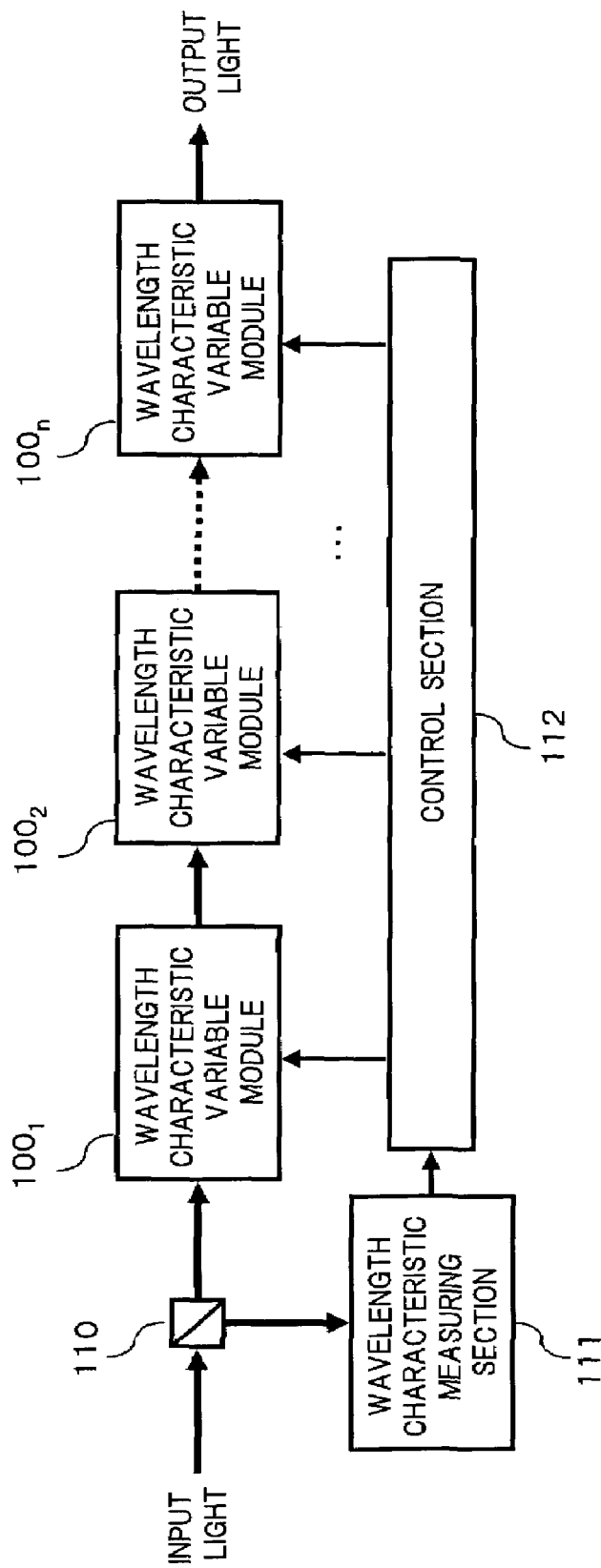
FIG. 15 is a functional block diagram showing another constitutional example related to the fifth embodiment.

Also in the fifth embodiment, the wavelength characteristics of the light output from the wavelength characteristics variable module $100_n$ are monitored to feedback control each of the wavelength characteristics variable modules $100_1$ to $100_n$. However, as shown in FIG. 15, the optical branching device 110 may be arranged at the previous stage of the wavelength characteristics variable module $100_1$, so that the wavelength characteristics of the light input to the wavelength characteristics variable module 100 are monitored, to perform feedforward control of each of the wavelength characteristics variable modules $100_1$ to $100_n$.

An optical amplifier using the wavelength characteristics variable apparatus according to the present invention will now be described.

Figure 16:
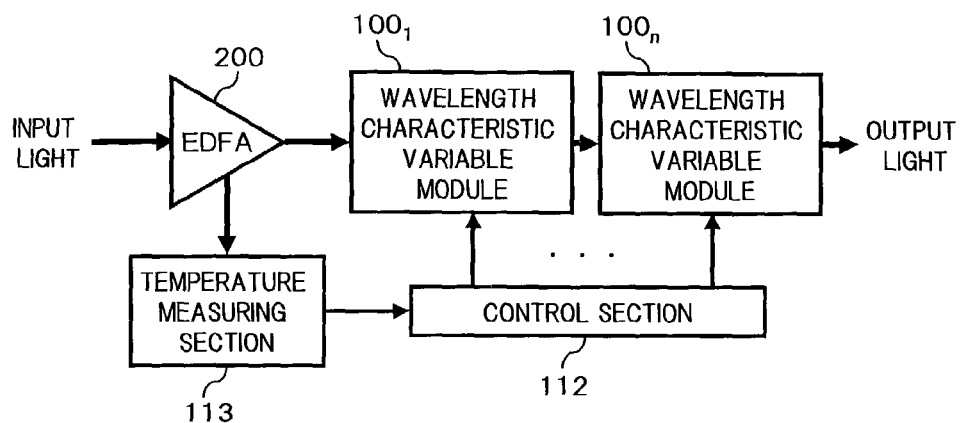
FIG. 16 is a functional block diagram showing a constitution of an optical amplifier according to a sixth embodiment of the present invention.

FIG. 16 is a functional block diagram showing the construction of an optical amplifier according to a sixth embodiment of the present invention.

In FIG. 16, the optical amplifier in the sixth embodiment includes, for example, an erbium-doped optical fiber amplifier (EDFA) 200, a plurality of (herein, n in number) wavelength characteristics variable modules $100_1$ to $100_n$ serially connected to the subsequent stage of the EDFA 200, a temperature measuring section 113 that measures the temperature of the EDFA 200, and a control section 112 that feedforward controls the transmission wavelength characteristics of each of the wavelength characteristics variable modules $100_1$ to $100_n$.

Figure 17:
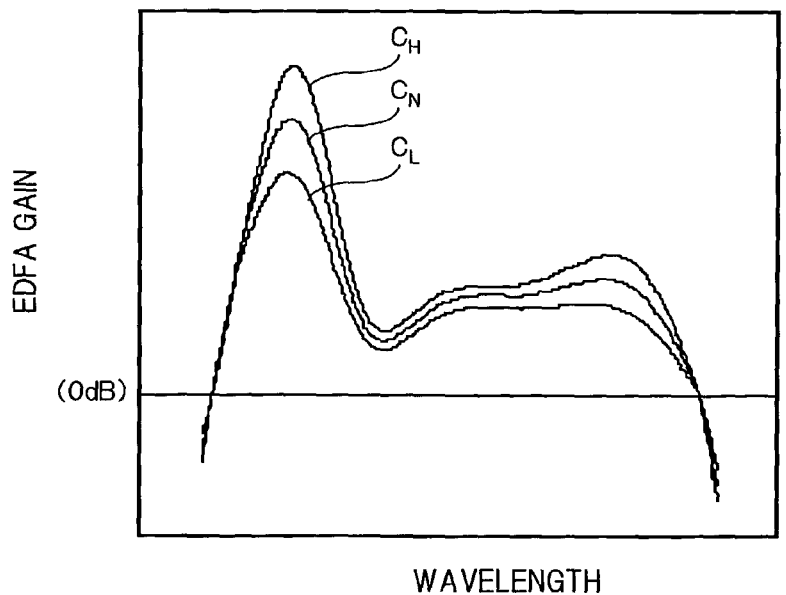
FIG. 17 is a diagram for explaining gain wavelength characteristics of an EDFA in the sixth embodiment.

The EDFA 200 comprises a construction similar to that of the known EDFA, and is assumed herein to show gain wavelength characteristics as shown in FIG. 17, for example. In FIG. 17, the characteristic indicated by symbol $C_N$ is one example of the gain wavelength characteristics at the normal temperature, the characteristic indicated by symbol $C_H$ is one example of the gain wavelength characteristics at the high temperature, and the characteristic indicated by symbol $C_L$ is one example of the gain wavelength characteristics at the low temperature. As seen from the example in FIG. 17, the gain wavelength characteristics of the EDFA 200 change according to the temperature, and equalization (flattening) of the gain wavelength characteristics, taking such a temperature change into consideration, is performed by the wavelength characteristics variable modules $100_1$ to $100_n$ in the subsequent stage.

Each of the wavelength characteristics variable modules $100_1$ to $100_n$ is obtained by modularization of the construction of the wavelength characteristics variable apparatus in the second or third embodiment shown in FIG. 9 to FIG. 11. The transmission wavelength characteristics of each of the wavelength characteristics variable modules $100_1$ to $100_n$ are designed in advance for each required temperature, for example, by using the conventional Fourier series expansion method, with respect to the wavelength characteristics inverse to the gain wavelength characteristics of the EDFA 200.

Figure 18:
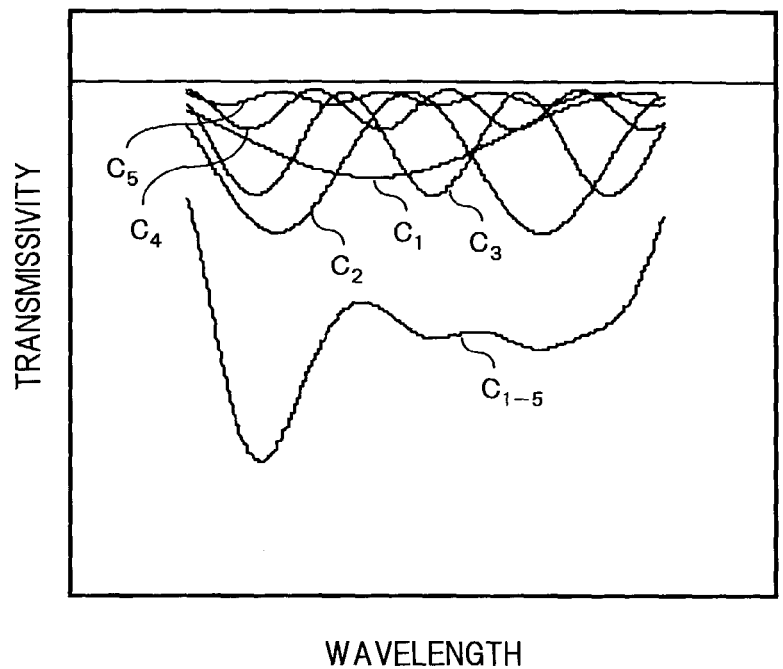
FIG. 18 is a diagram showing an example of transmission wavelength characteristics of variable wavelength characteristic modules at room temperature obtained by Fourier series expansion, and a transmission wavelength characteristic where these are combined, in the sixth embodiment.
Figure 19:
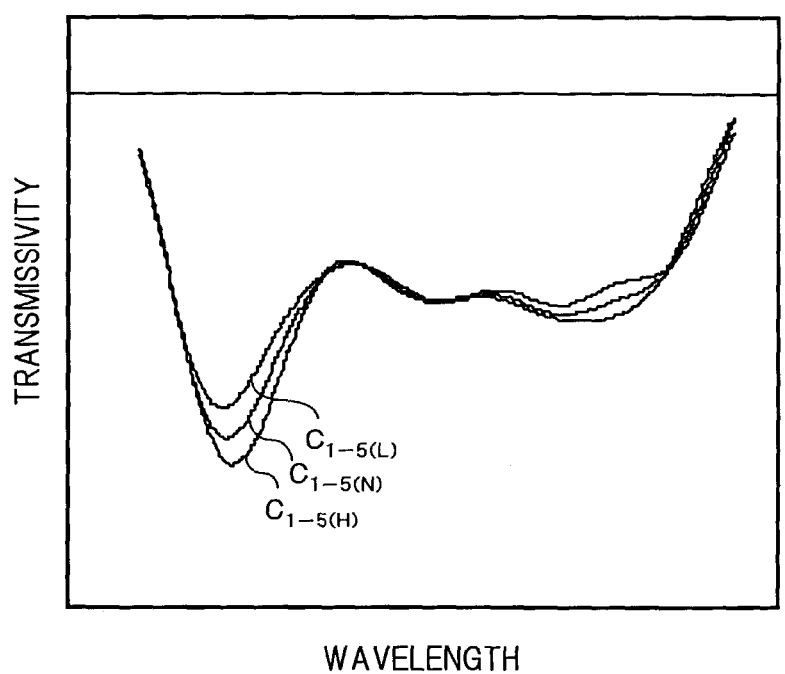
FIG. 19 is a diagram showing an example of temperature characteristic of the combined transmission wavelength characteristic in the sixth embodiment.

FIG. 18 is a diagram showing an example of the respective transmission wavelength characteristics of wavelength characteristics variable modules $100_1$ to $100_n$ obtained by the Fourier series expansion, and the transmission wavelength characteristics obtained by combining these, at the normal temperature. In FIG. 18, the inverse of the gain wavelength characteristics of the EDFA 200 at the normal temperature is subjected to the Fourier series expansion, to design the transmission wavelength characteristics $C_1$ to $C_5$ of the respective wavelength characteristics variable modules $100_1$ to $100_5$, so as to match with the "sine" function of from the first term to the fifth term. Thus, a combined transmission wavelength characteristic $C_{1-5}$ is obtained by serially connecting each of the wavelength characteristics variable modules $100_1$ to $100_5$. Moreover, the transmission wavelength characteristics corresponding to the inverse of the gain wavelength characteristics of the EDFA 200 at the high temperature and at the low temperature can be obtained, by changing each amplitude or periodic characteristic of the transmission wavelength characteristics $C_1$ to $C_5$ of the respective wavelength characteristics variable modules $100_1$ to $100_5$ at the normal temperature. FIG. 19 shows an example of the characteristics $C_{1-5(N)}$, $C_{1-5(H)}$, $C_{1-5(L)}$ obtained by combining the transmission wavelength characteristics of the wavelength characteristics variable modules $100_1$ to $100_5$ at the normal temperature, the high temperature and the low temperature.

The temperature measuring section 113 measures the temperature of the EDFA 200, and outputs a signal indicating the measurement result to the control section 112.

The control section 112 stores control values (current values of the variable current source 4 and the driving conditions of the movable sections 1C and 1C') corresponding to the transmission wavelength characteristics of the respective wavelength characteristics variable modules $100_1$ to $100_n$ designed by, for example, the Fourier series expansion or the like as described above, corresponding to the required temperatures, and reads out the control value corresponding to the temperature measured by the temperature measuring section 113, to control the current value of the variable current source 4 for each of the wavelength characteristics variable modules $100_1$ to $100_n$ and the movable sections 1C and 1C'.

In the optical amplifier having the above described construction, the optical signal input to the EDFA 200 is amplified according to the gain wavelength characteristics shown in FIG. 17, to be output to the wavelength characteristics variable module $100_1$ in the first stage. At this time, the temperature of the EDFA 200 is measured by the temperature measuring section 113, and the measurement result is sent to the control section 112. As a result, the transmission wavelength characteristics of each of the wavelength characteristics variable modules $100_1$ to $100_n$ are feedforward controlled, in accordance with the control value corresponding to the measured temperature. The optical signal output from the EDFA 200 passes through each of the wavelength characteristics variable modules $100_1$ to $100_n$ sequentially, to thereby perform gain equalization according to the transmission wavelength characteristics as shown in FIG. 18 and FIG. 19. As a result, an optical signal having flattened wavelength characteristics is output from the wavelength characteristics variable module $100_n$.

As described above, according to the optical amplifier in the sixth embodiment, since a plurality of wavelength characteristics variable modules $100_1$ to $100_n$ are serially connected to the subsequent stage of the EDFA 200 to control the transmission wavelength characteristics of each of the wavelength characteristics variable modules $100_1$ to $100_n$ corresponding to the temperature of the EDFA 200, the gain wavelength characteristics of the EDFA 200 inclusive of the temperature change can be actively compensated. As a result, an optical amplifier capable of stably realizing flat gain wavelength characteristics can be provided.

An optical amplifier according to a seventh embodiment of the present invention will now be described.

Figure 20:
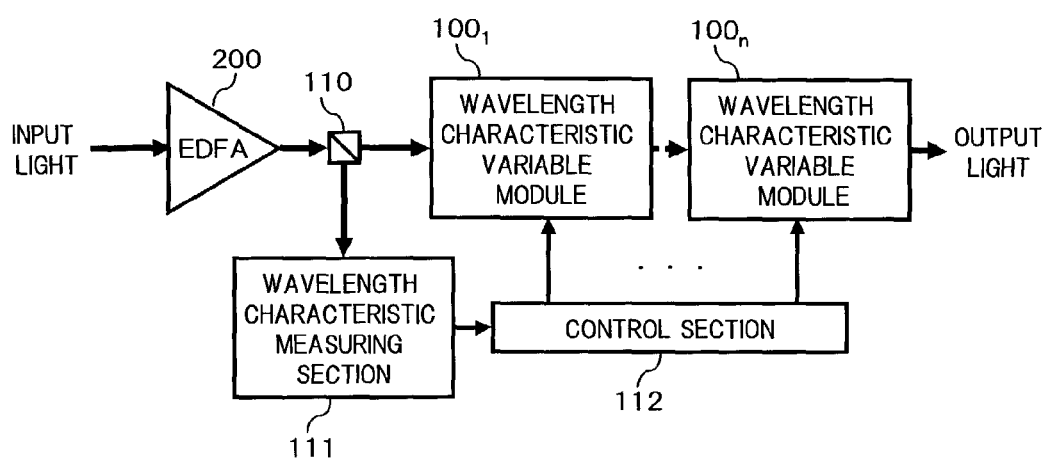
FIG. 20 is a functional block diagram showing a constitution of an optical amplifier according to a seventh embodiment of the present invention.

FIG. 20 is a functional block diagram showing the construction of the optical amplifier according to the seventh embodiment.

In FIG. 20, a part in which the construction of this optical amplifier is different from the construction of the optical amplifier in the sixth embodiment shown in FIG. 11 is that the optical branching device 110 and the wavelength characteristics measuring section 111 are provided instead of the temperature measuring section 113. The construction of other parts is the same as in the sixth embodiment.

The optical branching device 110 branches a part of the optical signal output from the EDFA 200 to the wavelength characteristics variable module $100_1$, and outputs it as a monitor light to the wavelength characteristics measuring section 111. The wavelength characteristics measuring section 111 measures the optical power with respect to the wavelength for the monitor light from the optical branching device 110, and transmits the measurement result to the control section 112.

In the optical amplifier having such a construction, a part of the optical signal amplified by the EDFA 200 is branched by the optical branching device 110 as a monitor light and sent to the wavelength characteristics measuring section 111, and the gain wavelength characteristics of the EDFA 200 is actually measured, and the measurement result is transmitted to the control section 112. In the control section 112, for example, the inverse of the gain wavelength characteristics of the EDFA 200 actually measured by the wavelength characteristics measuring section 111 is subjected to the Fourier series expansion or the like, to calculate the transmission wavelength characteristics of each of the wavelength characteristics variable modules $100_1$ to $100_n$, and each of the wavelength characteristics variable modules $100_1$ to $100_n$ is feedforward controlled in accordance with the calculation result. The optical signal output from the EDFA 200 then passes through each of the wavelength characteristics variable modules $100_1$ to $100_n$ sequentially, so that an optical signal having substantially flat wavelength characteristics is output from the wavelength characteristics variable module $100_n$.

According to the optical amplifier in the seventh embodiment described above, an effect similar to that of the sixth embodiment can be obtained by controlling the transmission wavelength characteristics of each of the wavelength characteristics variable modules $100_1$ to $100_n$ according to the gain wavelength characteristics of the EDFA 200 actually measured by the wavelength characteristics measuring section 111. By actually measuring the gain wavelength characteristics of the EDFA 200, the transmission wavelength characteristics of each of the wavelength characteristics variable modules $100_1$ to $100_n$ can be optimized with respect to not only a change in the gain wavelength characteristics due to a temperature change, but also, for example, a change in the gain wavelength characteristics when the concentration of the additive in the EDF is changed, and a change in the gain wavelength characteristics when the input light level is changed at the time of operation of the ALC. Hence, it becomes possible to realize more stable gain equalization.

In the seventh embodiment, the optical branching device 110 is arranged between the EDFA 200 and the wavelength characteristics variable module $100_1$, so as to feedforward control the transmission wavelength characteristics of each of the wavelength characteristics variable modules $100_1$ to $100_n$. But in addition to this, the optical branching device 110 may be arranged in the subsequent stage of the wavelength characteristics variable module $100_n$, to feedback control the transmission wavelength characteristics of each of the wavelength characteristics variable modules $100_1$ to $100_n$.

An optical amplifier according to an eighth embodiment of the present invention will now be described.

Figure 21:
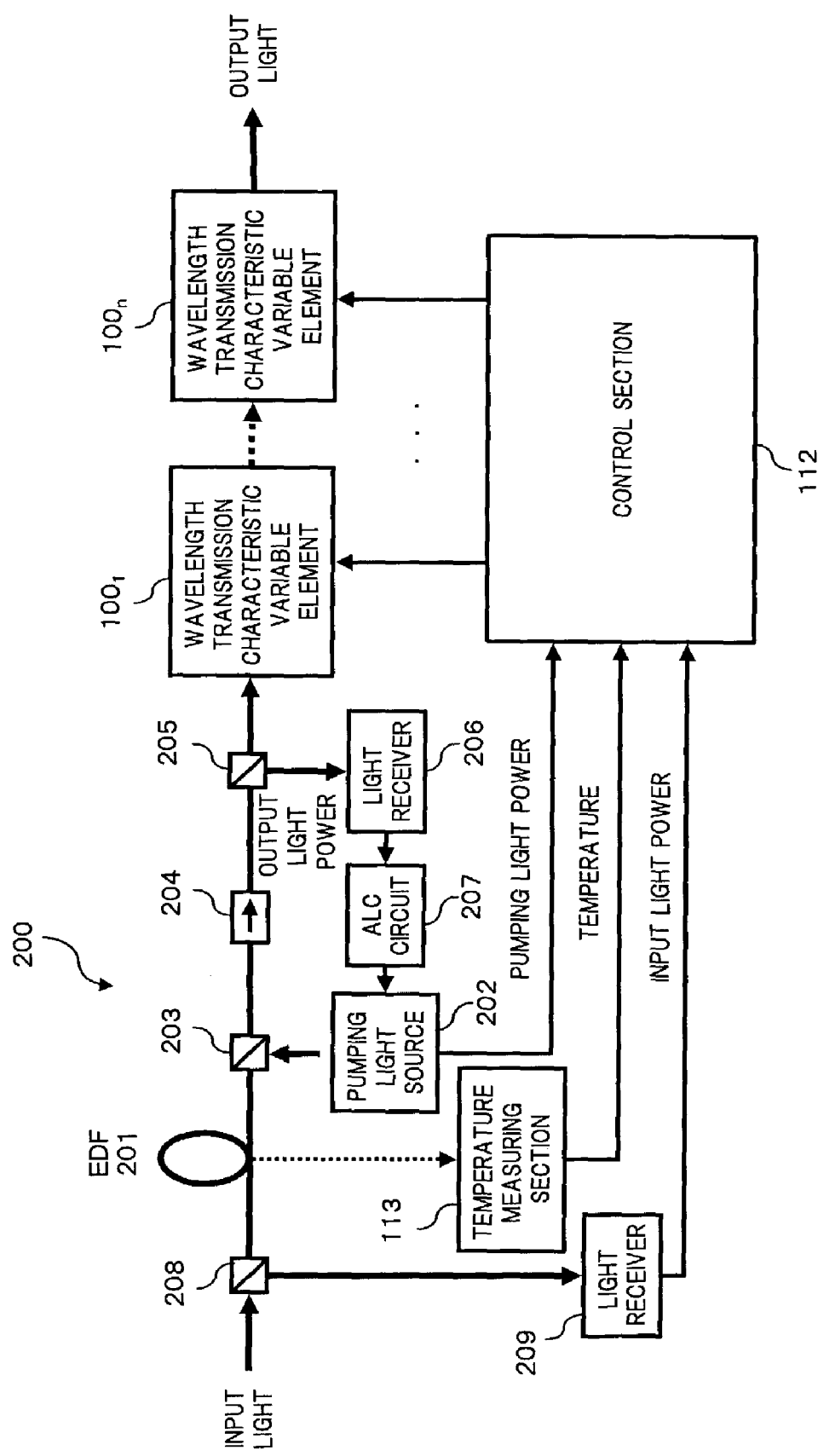
FIG. 21 is a functional block diagram showing a constitution of an optical amplifier according to an eighth embodiment of the present invention.

FIG. 21 is a functional block diagram showing the construction of the optical amplifier according to the eighth embodiment.

In FIG. 21, in this optical amplifier, the control section 112 feedforward controlling the transmission wavelength characteristics of each of the wavelength characteristics variable modules $100_1$ to $100_n$ serially connected to the subsequent stage of the EDFA 200, judges the inverse of the gain wavelength characteristics of the EDFA 200, based on the monitoring result of the input light power, the pumping light power and the temperature of the EDFA 200, and controls the current value of the variable current source 4 for each of the wavelength characteristics variable modules $100_1$ to $100_n$, according to the inverse.

Specifically, the EDFA 200 includes, for example, an erbium-doped optical fiber (EDF) 201, a pumping light source 202 generating pumping light, an optical multiplexer 203 supplying the pumping light to the EDF 201, an optical isolator 204 arranged in the subsequent stage of the optical multiplexer 203, an optical branching device 205 branching a part of the optical signal having been amplified by the EDF 201 and passed through the optical multiplexer 203 and the optical isolator 204, a light receiver 206 receiving the branched light from the optical branching device 205 to detect an output light power, an ALC circuit 207 controlling a drive condition of the pumping light source 202 so that the output light power detected by the light receiver 206 becomes constant at a level set in advance, an optical branching device 208 branching a part of the optical signal to be input to the EDF 201, a light receiver 209 receiving the branched light from the optical branching device 208 to detect an input light power, and a temperature measuring section 113 comprising a temperature sensor measuring the temperature of the EDF 201.

The control section 112 is input with information related to the input light power detected by the light receiver 209 of the EDFA 200, the pumping light power output from the pumping light source 202 and the temperature measured by the temperature sensor, respectively, and judges the inverse of the gain wavelength characteristics of the EDFA 200 based on this information. With this judgment method of the inverse, for example, it is possible that the gain wavelength characteristics of the EDFA 200 corresponding to the input light power, the pumping light power and the temperature are stored in the control section 112 beforehand, and the corresponding gain wavelength characteristics are read out in response to the input information from the EDFA 200 to determine the inverse. The control section 112 subjects the judged inverse to the Fourier series expansion or the like, to calculate the transmission wavelength characteristics of each of the wavelength characteristics variable modules $100_1$ to $100_n$, and feedforward controls each of the wavelength characteristics variable modules $100_1$ to $100_n$ in accordance with the calculation result.

As described above, according to the optical amplifier in the eighth embodiment, an effect similar to that of the seventh embodiment can be obtained by controlling the transmission wavelength characteristics of each of the wavelength characteristics variable modules $100_1$ to $100_n$ corresponding to the gain wavelength characteristics judged based on the input light power, the pumping light power and the temperature of the EDFA 200.

In the above eighth embodiment, a backward pumping type construction is exemplified as the EDFA 200, but the construction of the EDFA 200 in the present invention is not limited thereto, and a forward pumping type or a bi-directional pumping type construction may be used. The present invention is also applicable to an EDFA having a multistage amplifying construction in which a plurality of EDFs is connected in series or parallel with each other. Further, the optical amplifier of the present invention is not limited to one using the EDFA, but known optical amplifiers such as an optical fiber amplifier using a rare earth element-doped fiber in which a rare earth element other than erbium is doped, or a semiconductor optical amplifier can be used.

Next, an optical transmission system using the wavelength characteristics variable apparatus, or the optical amplifier according to the present invention will now be described.

Figure 22:
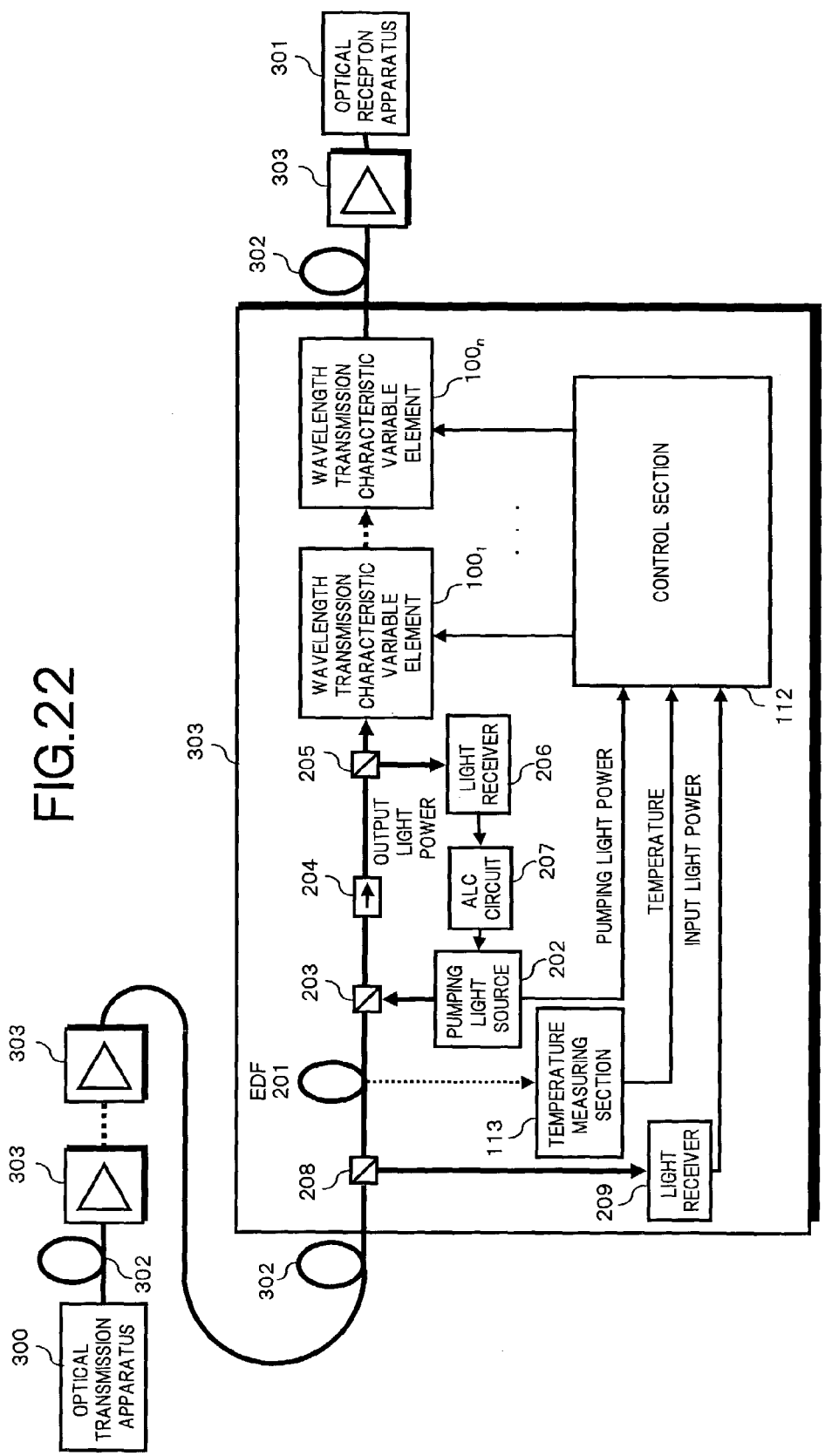
FIG. 22 is a block diagram showing a constitution of an optical transmission system according to a ninth embodiment of the present invention.

FIG. 22 is a block diagram showing the construction of an optical transmission system according to a ninth embodiment of the present invention.

In FIG. 22, the optical transmission system has a construction in which, for example, an optical transmission apparatus 300 and an optical reception apparatus 301 are connected by an optical fiber transmission line 302, and a plurality of optical repeaters 303 is arranged with required intervals therebetween on the optical fiber transmission line 302, wherein each optical repeater 303 comprises the optical amplifier of, for example, the eighth embodiment shown in FIG. 22.

In such an optical transmission system, wavelength division multiplex (WDM) signal light transmitted from the optical transmission apparatus 300 to the optical fiber transmission line 302 is repeatedly transmitted to the optical reception apparatus 301, while being amplified to a required level. At this time, in each optical repeater 303, gain equalization of the EDFA 200 is performed in the same manner as in the eighth embodiment, and hence even when a temperature change or the like occurs in each optical repeater 303, a WDM signal light having flat wavelength characteristics is output from each optical repeater 303 to the optical fiber transmission line 302. As a result, the optical reception apparatus 301 can receive the optical signal of each channel with the optical SNR equalized. Hence, it becomes possible to provide an optical transmission system realizing excellent transmission characteristics.

In the optical transmission system in the ninth embodiment, there is shown a case where each optical repeater 303 comprises the optical amplifier in the eighth embodiment, but the present invention is not limited thereto, and each optical repeater 303 may comprise the optical amplifier in the sixth embodiment or the seventh embodiment. Moreover, a plurality of optical repeaters 303 is arranged on the optical fiber transmission line 302, but the construction may be such that one optical repeater 303 is arranged on the optical fiber transmission line 302.

An optical transmission system according to a tenth embodiment of the present invention will now be described.

Figure 23:
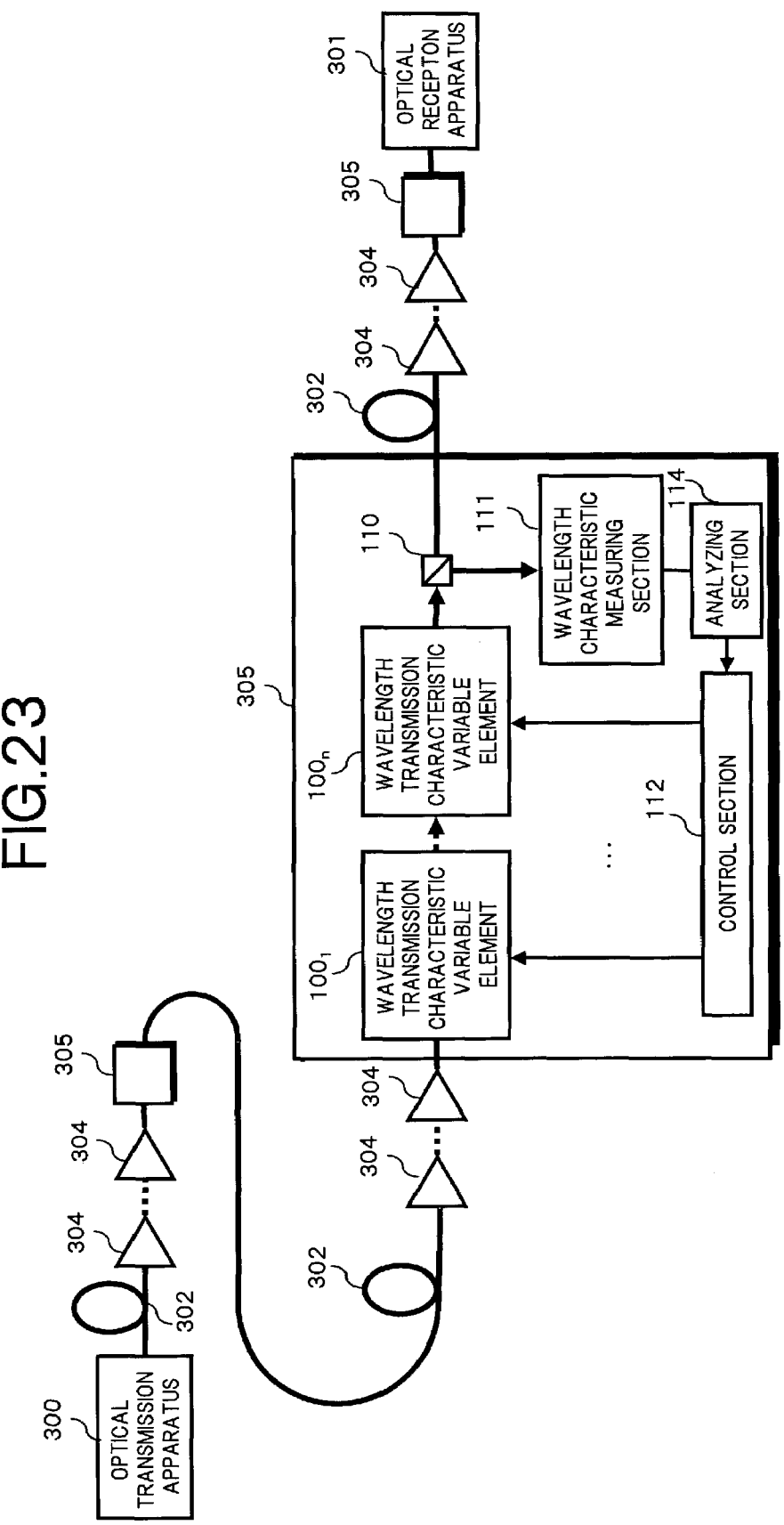
FIG. 23 is a block diagram showing a constitution of an optical transmission system according to a tenth embodiment of the present invention.

FIG. 23 is a block diagram showing the construction of the optical transmission system according to the tenth embodiment of the present invention.

In FIG. 23, the optical transmission system has a system configuration in which, for example, an optical transmission apparatus 300 and an optical reception apparatus 301 are connected by an optical fiber transmission line 302, and a plurality of optical repeaters 304 and a plurality of wavelength characteristics variable apparatuses 305 are arranged on the optical fiber transmission line 302.

Differently from those of the ninth embodiment, the optical repeaters 304 are optical repeaters of the conventional construction provided on the optical fiber transmission line 302 with required intervals. The wavelength characteristics variable apparatuses 305 are wavelength characteristics variable apparatuses of the same construction as in the fifth embodiment shown in FIG. 14 arranged for each previously set repeating section.

In such an optical transmission system, wavelength division multiplex (WDM) signal light transmitted from the optical transmission apparatus 300 to the optical fiber transmission line 302 is amplified to a required level by each optical repeater 304, and passes through the wavelength characteristics variable apparatus 305 arranged for each required repeating section. Hence, the wavelength dependency which occurs in the optical fiber transmission line 302 and the optical repeaters 304 (deviation of the optical power between optical signals of respective channels) is equalized, and a WDM signal light having substantially flat wavelength characteristics is repeatedly transmitted to the optical reception apparatus 301. Each wavelength characteristics variable apparatus 305 measures the wavelength characteristics of the monitor light obtained by branching a part of the transmitted light, specifically in the same manner as in the ninth embodiment, and here, based on the measurement result, the inverse of the wavelength characteristics of the monitor light is subjected to the Fourier series expansion or the like in an analyzing section 114, to thereby calculate the transmission wavelength characteristics of each of the wavelength characteristics variable modules $100_1$ to $100_n$. Based on the calculation result, the control section 112 feedback controls the transmission wavelength characteristics of each of the wavelength characteristics variable modules $100_1$ to $100_n$. As a result, the optical reception apparatus 301 can receive the optical signal of each channel with the optical SNR equalized. Hence, it becomes possible to provide an optical transmission system realizing excellent transmission characteristics.

Figure 24:
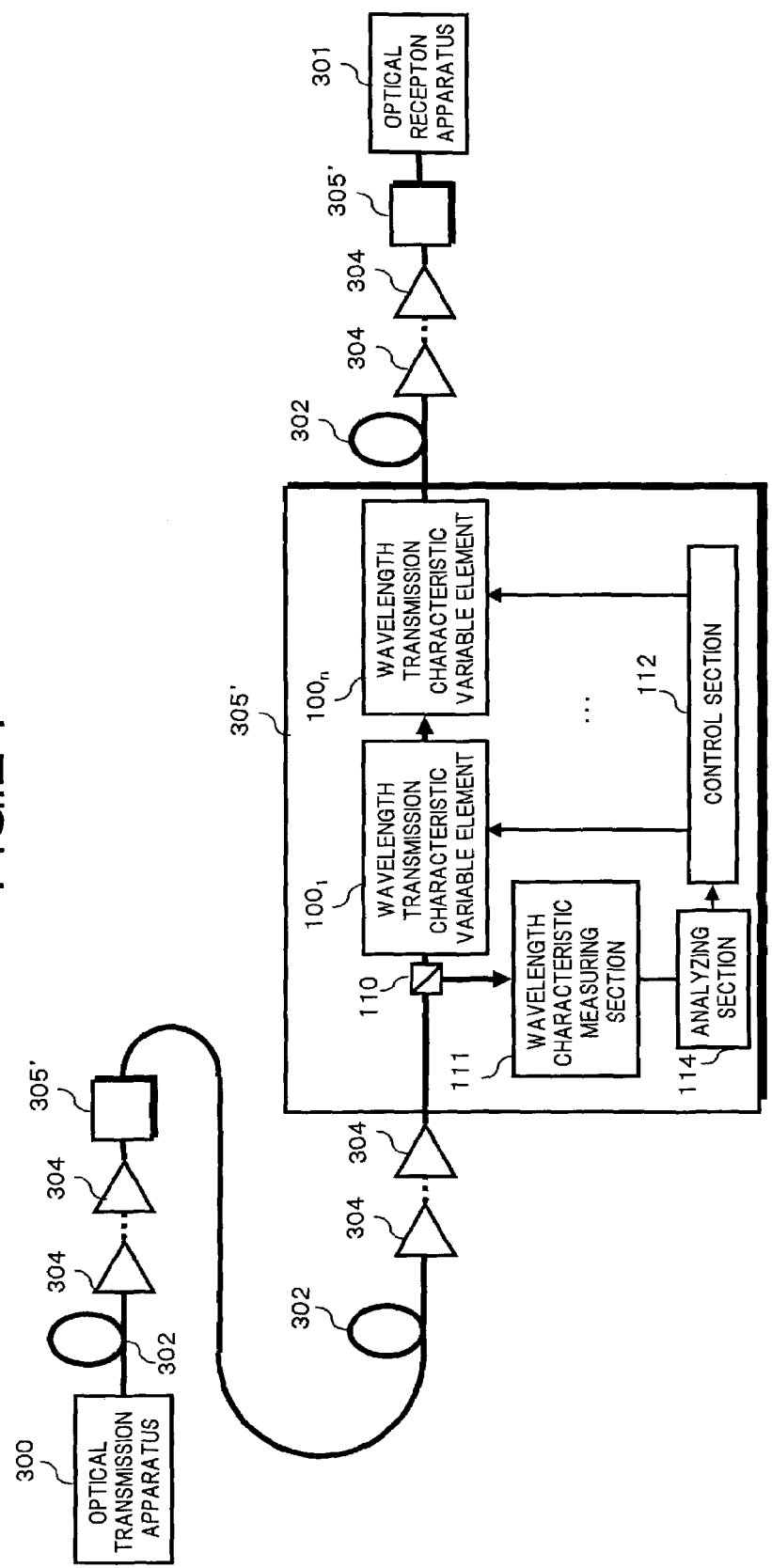
FIG. 24 is a functional block diagram showing another constitutional example related to the tenth embodiment.

In the optical transmission system in the tenth embodiment, as each wavelength characteristics variable apparatus 305, the construction in which the transmission wavelength characteristics of the wavelength characteristics variable modules $100_1$ to $100_n$ are feedback controlled is shown. However, for example as shown in FIG. 24, a wavelength characteristics variable apparatus 305' having a construction such that the transmission wavelength characteristics of the wavelength characteristics variable modules $100_1$ to $100_n$ are feedforward controlled may be used.

What is claimed are:

1. An optical element comprising:
a polarization rotating section composed of a plurality of magneto-optical crystals, and rotating a polarization direction of incident light;
a first and a second reflecting planes, both attached to said polarization rotating section and constituting a Fabry-Perot interferometer and;
a controller changing a distance between said first reflecting plane and said second reflecting plane.

2. An optical element according to claim 1, wherein
said polarization rotating section includes a pair of magneto-optical crystals of wedge shape with equal apex angles, arranged to be in close contact at taper surfaces thereof; a fixed magnetic field generating section that gives a fixed magnetic field to said pair of magneto-optical crystals; a variable magnetic field generating section that gives a variable magnetic field to said pair of magneto-optical crystals in a different direction to that of said fixed magnetic field; and a variable magnetic field control section that controls the variable magnetic field generated by said variable magnetic field generating section,
said first and second reflecting planes includes respective reflection films formed on a light incident plane and a light emitting plane parallel to each other and each of said pair of magneto-optic crystals, and
said controller includes movable sections that relatively move said pair of magneto-optic crystals while holding the respective taper surfaces in close contact, to change a distance between said respective reflection films.

3. An optical element according to claim 2, wherein each of said movable sections is provided with a moving mechanism capable of vertically moving a support member having one end fixed to a surface opposite to the apex angle of each of said pair of magneto-optical crystals and also having a degree of freedom in a horizontal direction for a condition of attachment thereof to the other end of said support member.

4. An optical element according to claim 2, wherein said respective reflection films have a reflectance of 5% or more.

5. An optical element according to claim 4, wherein said respective reflection films have a reflectance of 50% or less.

6. An apparatus wherein:
a wavelength characteristics variable apparatus using the transmission wavelength characteristics variable optical element recited in claim 1,
a first optical device that determines the polarization of light entering into said transmission wavelength characteristics variable optical element;
a second optical device that cuts out specific polarized light from the light emitted from said transmission wavelength characteristics variable optical element; and
a variable Faraday rotator that is arranged between said first optical device and said second optical device, and gives a Faraday rotation angle according to the rotation angle given to the transmitted light by said transmission wavelength characteristics variable optical element.

7. An apparatus according to claim 6,
wherein said variable Faraday rotator gives a Faraday rotation angle which is in an opposite rotation direction and which has substantially the same size with respect to the rotation angle in said transmission wavelength characteristics variable optical element, to the transmitted light.

8. An apparatus according to claim 6, comprising:
a first lens for supplying the light emitted from a core end face of a first optical fiber to said first optical device; and
a second optical lens which converges the light emitted from said second optical device and combines the converged light to a core end face of a second optical fiber under a predetermined condition.

9. An apparatus according to claim 6,
wherein
said first optical device is a first wedge plate comprising a birefringent material, and
said second optical device is a second wedge plate comprising a birefringent material, and the top and the bottom of said second wedge plate are arranged so as to face the bottom and the top of said first wedge plate respectively, and so that corresponding planes are parallel with each other.

10. An apparatus according to claim 6,
wherein said first optical device and said second optical device are a first flat plate and a second flat plate comprising a birefringent material.

11. A wavelength characteristics variable apparatus, wherein the apparatus recited in claim 6 is modularized to serially connect a plurality of modules, to thereby obtain variable transmission wavelength characteristics corresponding to the product of respective transmission wavelength characteristics.

12. An apparatus according to claim 6, further comprising:
a light branching section that branches a part of light after having been transmitted through said optical element;
a wavelength characteristics measuring section that measures the wavelength characteristics of the branched light from said light branching section; and
a control section that adjusts at least one of the rotation angle of the polarization direction given to the transmitted light by said transmission wavelength characteristics variable optical element, and the distance between the respective reflecting planes of said optical element, to control the transmission wavelength characteristics, based on the measurement result of said wavelength characteristic measuring section.

13. An apparatus according to claim 6, further comprising:
a light branching section that branches a part of light before being transmitted through said optical element;
a wavelength characteristics measuring section that measures the wavelength characteristics of the branched light from said light branching section; and
a control section that adjusts at least one of the rotation angle of the polarization direction given to the transmitted light by said transmission wavelength characteristics variable optical element, and the distance between the respective reflecting planes of said optical element, to control the transmission wavelength characteristics, based on the measurement result of said wavelength characteristic measuring section.

14. An optical amplifier wherein said optical amplifier amplifies and outputs optical signals, comprises the wavelength characteristics variable apparatus recited in claim 6, and equalization of gain wavelength characteristics is performed by said wavelength characteristics variable apparatus.

15. An optical amplifier according to claim 14, comprising:
an optical amplifying section that amplifies light entering into said wavelength characteristics variable apparatus;
a measurement section that measures data related to the gain wavelength characteristics of said optical amplifying section; and
a control section that adjusts at least one of the rotation angle of the polarization direction given to the transmitted light by said optical element of said wavelength characteristic variable apparatus, and the distance between the respective reflecting planes of said optical element, based on the measurement result of said measuring section, to thereby control transmission wavelength characteristics, so that the gain wavelength characteristics of said optical amplifying section can be equalized.

16. An optical amplifier according to claim 15, wherein said measurement section measures the temperature of said optical amplifying section, and
said control section judges the gain wavelength characteristics of said optical amplifying section, to control the transmission wavelength characteristics of said wavelength characteristics variable apparatus so that said gain wavelength characteristics measured can be equalized.

17. An optical amplifier according to claim 15, wherein said measurement section measures the gain wavelength characteristics using the output light of said optical amplifying section, and
said control section controls the transmission wavelength characteristics of said wavelength characteristics variable apparatus so that the gain wavelength characteristics measured by said measurement section can be equalized.

18. An optical amplifier according to claim 15, wherein said control section controls the transmission wavelength characteristics of said wavelength characteristics variable apparatus according to the wavelength characteristics determined by a Fourier series expansion of the inverse of the gain wavelength characteristics of said optical amplifying section.

19. An optical amplifier according to claim 15, wherein said optical amplifying section includes a rare earth element-doped optical fiber amplifier.

20. An optical amplifier according to claim 19, wherein
said measurement section measures input light power, pumping light power, and temperature with regard to said optical amplifying section, and
said control section judges the gain wavelength characteristics of said optical amplifying section based on the input light power, the pumping light power, and the temperature measured by said measurement section, to control the transmission wavelength characteristics of said wavelength characteristics variable apparatus so that said gain wavelength characteristics can be equalized.

21. An optical transmission system for transmitting an optical signal from an optical transmission apparatus to an optical reception apparatus via an optical transmission line, wherein the wavelength characteristics variable apparatus recited in claim 6 is provided on said optical transmission line.

22. An optical transmission system according to claim 21, comprising
a plurality of optical repeaters on said optical transmission line,
wherein said wavelength characteristics variable apparatus is arranged for each previously set repeating section.

23. An optical transmission system for repeatedly transmitting an optical signal from an optical transmission apparatus to an optical reception apparatus via an optical transmission line and an optical repeater,
wherein said optical repeater includes the optical amplifier recited in claim 14.

24. A control method of controlling wavelength characteristics of light comprising:
generating periodic transmission wavelength characteristics by multiple reflection of light between a first reflecting plane and a second reflecting plane;
rotating a polarization direction of light passing through a plurality of magneto-optic crystals between said first and second reflecting planes; and
controlling a distance between said first and second reflecting planes.

25. An optical element according to claim 1, wherein said plurality of magneto-optical crystals are placed between first and said second reflecting planes.

26. An optical element according to claim 1, wherein said first and said second reflecting planes are provided with a polarization-rotation effect where in a antireflection coating is not required by placing said plurality of magneto-optical crystals between first and said second reflecting planes.

* * * * *

UNITED STATES PATENT AND TRADEMARK OFFICE
CERTIFICATE OF CORRECTION

| | |
|---|---|
| PATENT NO. | : 7,016,096 B2 |
| APPLICATION NO. | : 10/351376 |
| DATED | : March 21, 2006 |
| INVENTOR(S) | : Hirotomo Izumi et al. |

Page 1 of 1

It is certified that error appears in the above-identified patent and that said Letters Patent is hereby corrected as shown below:

On Title page, Item (56) col. 2, "OTHER PUBLICATIONS" in line 2, delete "magnetooptic" and insert --magneto-optic-- column 22, line 13 in claim 3, after "crystals" insert --,-- column 23, line 35 in claim 14, after "amplifier" insert --,-- column 24, line 35 in claim 22, after "comprising" insert --:-- column 24, line 62 in claim 26, delete "where in a " and insert --wherein an--

Signed and Sealed this

Twenty-second Day of August, 2006

JON W. DUDAS
*Director of the United States Patent and Trademark Office*